United States Patent
Marc et al.

(10) Patent No.: US 10,730,431 B2
(45) Date of Patent: Aug. 4, 2020

(54) ILLUMINATION SYSTEMS FOR A STEERING ASSEMBLY

(71) Applicant: Joyson Safety Systems Acquisition LLC, Auburn Hills, MI (US)

(72) Inventors: Adorian Marc, Troy, MI (US); Jason Nikolauk, Auburn Hills, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 16/242,343

(22) Filed: Jan. 8, 2019

(65) Prior Publication Data

US 2019/0210520 A1    Jul. 11, 2019

Related U.S. Application Data

(60) Provisional application No. 62/614,994, filed on Jan. 8, 2018.

(51) Int. Cl.
*B60Q 3/283*    (2017.01)
*F21V 23/00*    (2015.01)
*F21V 23/06*    (2006.01)
*B62D 1/04*    (2006.01)
*B60Q 3/66*    (2017.01)
*B60Q 3/80*    (2017.01)
(Continued)

(52) U.S. Cl.
CPC .............. *B60Q 3/283* (2017.02); *B60Q 3/66* (2017.02); *B60Q 3/80* (2017.02); *B62D 1/046* (2013.01); *B62D 1/06* (2013.01); *F21V 23/005* (2013.01); *F21V 23/06* (2013.01); *F21Y 2115/15* (2016.08)

(58) Field of Classification Search
None
See application file for complete search history.

(56) References Cited

U.S. PATENT DOCUMENTS 10,011,222 B1 * 7/2018 Wu ........................ H02N 1/04
10,036,843 B2 * 7/2018 Lisseman ............. G02B 6/0088
(Continued)

FOREIGN PATENT DOCUMENTS

DE    202009003968 U1    6/2009
DE    102008037442 A1    2/2010
(Continued)

*Primary Examiner* — Britt D Hanley
(74) *Attorney, Agent, or Firm* — Meunier Carlin & Curfman LLC

(57) ABSTRACT

The present disclosure is directed to an illuminated emblem assembly coupled to a steering wheel assembly and a method of assembling the same. The illuminated emblem assembly includes a conductive plate having a generally U-shape and formed from an electrically conductive material, a light source coupled to a PCB which is coupled to the conductive plate such that an electrical signal is provided to the light source from the vehicle control system via the PCB. The emblem assembly includes a base disposed on a top surface of the conductive plate also having a generally U-shape where the base includes an opening adjacent the light source for directing light emitted from the light source towards a U-shaped volume defined by a top surface of the base. Light is transmitted from the light source towards the user through an outer cap being disposed over the base.

18 Claims, 25 Drawing Sheets

(51) Int. Cl.
*B62D 1/06* (2006.01)
*F21Y 115/15* (2016.01)

(56) References Cited

U.S. PATENT DOCUMENTS

| | | | | |
|---|---|---|---|---|
| 2010/0218641 | A1* | 9/2010 | Neumann | B60K 35/00 |
| | | | | 74/552 |
| 2015/0123947 | A1* | 5/2015 | Jubner | B62D 1/046 |
| | | | | 345/175 |
| 2016/0025281 | A1* | 1/2016 | Gardner | B62D 1/06 |
| | | | | 362/516 |
| 2016/0200246 | A1* | 7/2016 | Lisseman | B60Q 9/00 |
| | | | | 701/36 |
| 2019/0275935 | A1* | 9/2019 | Lisseman | B62D 1/06 |

FOREIGN PATENT DOCUMENTS

| | | |
|---|---|---|
| JP | 2001114112 A | 4/2001 |
| JP | 6292804 B2 | 3/2018 |

* cited by examiner

ILLUMINATION SYSTEMS FOR A STEERING ASSEMBLY

CROSS REFERENCE TO RELATED APPLICATION

This application claims priority to U.S. Provisional Patent Application No. 62/614,994, filed Jan. 8, 2018, entitled "ILLUMINATION SYSTEMS FOR A STEERING ASSEMBLY," which is incorporated herein by reference in its entirety.

TECHNICAL FIELD

The present invention relates generally to illumination systems. In particular, illuminated emblem assemblies that are coupled to a steering assembly.

BACKGROUND OF THE INVENTION

Various ornamental emblems and driver displays incorporate visual, acoustic and/or haptic system for communicating with the driver. Visual interfaces for these systems must minimize driver distraction while operating the vehicle and the workload on the driver to comprehend and respond to the visual display information. Conventional instrument panel and center-stack displays require the driver's attention be drawn away from navigating the vehicle. Similarly, idealized heads up displays can be jarring and sometimes distracting to the driver. Therefore, a need in the art exists for an ornamental display that utilizes the driver's peripheral vision and allows the driver to keep both hands on the wheel while maintaining focus in their direct line of sight.

SUMMARY OF THE INVENTION

The present disclosure is directed to include illumination systems, such as illuminated emblem assemblies that are coupled to a steering assembly. The illuminated emblem assembly can be coupled to a rim of the steering assembly. In an aspect of the disclosure, an illuminated emblem assembly for a steering wheel assembly is disclosed. The illuminated emblem assembly includes a conductive plate having a generally U-shape and formed from an electrically conductive material, the conductive plate including a connector for electrically coupling the conductive plate to a vehicle control system; a light source coupled to a PCB, where the PCB is electrically coupled to the conductive plate such that an electrical signal is provided to the light source from the vehicle control system via the PCB; a base disposed on a top surface of the conductive plate and having a generally U-shape, the base including an opening adjacent the light source for directing light emitted from the light source towards a U-shaped volume defined by a top surface of the base; and an outer cap through which light is transmitted from the light source towards the user, the outer cap being disposed over the base and defining a volume between an inside surface of the outer cap and the base.

In some embodiments, the light source is received within the opening provided in the base.

In some embodiments, an optical film disposed along the top surface of the base, the optical film diffusing the light transmitted from the opening in the base and into the U-shaped volume defined by the top surface of the base In some embodiments, an end surface of the light source is positioned in contact with a bottom surface of the optical film.

In some embodiments, an end surface of the light source is positioned 0.6 mm or less from a bottom surface of the optical film.

In some embodiments, the optical film comprises at least one of a light diffusing film, a semi-translucent material, a semi-reflective film, and a one-way reflective film such that the light source is not visible through the optical film, and a light shaping film.

In some embodiments, the optical film causes ambient light directed towards the optical film to be reflected back towards the outer cap.

In some embodiments, the amount of ambient light deflected off an outer surface of the optical film is greater than the amount of ambient light that is deflected off the light source and passed back through optical film towards the outer cap.

In some embodiments, the PCB directs operation of the light source in response to illumination instructions received from a vehicle control system.

In some embodiments, the PCB is electrically coupled to the first end portion of the conductive plate and a second PCB is coupled at an opposite second end portion of the conductive plate, and a second light source coupled to the second PCB such that an electrical signal is provided to the second light source from the vehicle control system via the second PCB.

In some embodiments, the conductive plate is electrically coupled to a power source for providing power to the PCB via the connector, wherein the conductive plate is sized and configured to couple with a frame of the steering wheel assembly.

In some embodiments, the conductive plate includes a first end portion and a second end portion opposite and spaced apart from the first end portion, and an intermediate portion extending therebetween, the first and second end portions, forming a U-shape with the intermediate portion as viewed from a front side of the conductive plate. The intermediate portion of the conductive plate is relatively planar and the first end portion can extend in a first plane and the second end portion extends in a second plane, and at least a portion of the intermediate portion extends in a third plane that is transverse to the first and second planes.

In some embodiments, a cover extends around the base, the conductive plate and a portion of a frame of the steering wheel assembly. The cover includes a fastener extending from an inside surface of the cover towards the frame, where the fastener is sized and configured to engage a corresponding opening defined in the frame for coupling the cover to the frame. The conductive plate includes at least two locating portions that extend from a third plane transverse to the first and second planes, the locating portions are spaced apart along an axis extending along the intermediate portion and assist in centering the conductive plate with respect to faster extending from the inside surface of the cover.

In some embodiments, the base includes a first end portion and a second end portion opposite and spaced apart from the first end portion, and an intermediate portion extending therebetween. The first and second end portions forming a U-shape with the intermediate portion as viewed from a front side of the base, where the intermediate portion of the base is relatively planar. The first end portion of the base extends in a first base plane and the second end portion of the base extends in a second base plane, and at least a portion of the intermediate portion of the base extends in a third base plane that is transverse to the first and second base planes. The base is disposed within a U-shaped volume defined between the first and second end portions of the conductive plate.

In some embodiments, the base is disposed within the U-shaped volume defined between the first and second end portions of the conductive plate such that the first end portion of the base is adjacent the first end portion of the conductive plate, the second end portion of the base is adjacent the second end portion of the conductive plate, and the intermediate portion of the base is adjacent the intermediate portion of the conductive plate.

In some embodiments, the opening provided in the base includes a first opening and a second opening defined, respectively, at the first and second end portions of the base, where the first and second openings direct light emitted from the light source and a second light source, respectively, towards the U-shaped volume defined by the top surface of the base.

In some embodiments, a cover extends between the base and an outer surface of a rim of a steering wheel assembly, the cover including a front sidewall disposed adjacent a front surface of the rim and facing towards an operator, an opposite facing rear sidewall disposed adjacent a rear surface of the rim and facing away from the operator, and a curved central sidewall extending between the front and rear sidewalls. The front, rear and central sidewalls define a U-shaped profile as viewed from an end of the cover, where the front and rear sidewall each include a U-shaped edge that extends longitudinally along the cover, the U-shaped edges and an opening provided in the central sidewall define a U-shaped volume as viewed from a front side of the cover.

In some embodiments, the base is positioned adjacent the cover such that the U-shaped edges and edge of the opening provided in the central sidewall of the cover are located adjacent the corresponding U-shaped side edges and a top edge of the base.

In some embodiments, an outer surface of the cover has a surface contour sized and configured to correspond to an outer surface of a rim of the steering wheel assembly.

In some embodiments, an outer surface of the cover has a surface contour that extends outward from an outer surface of a rim of the steering wheel assembly.

In some embodiments, an outer surface of the outer cap has a surface contour sized corresponding to an outer surface of the cover.

In some embodiments, a decorative emblem is provided on a location including at least one of a surface of the outer cap and disposed in the volume between an inside surface of the outer cap and the base where the decorative emblem is viewed through the outer cap.

In some embodiments, the outer cap is constructed from a material that is at least one of a transparent material and a translucent material, wherein the material of the outer cap includes at least one of a colored material, a clear material, and a patterned material.

In another aspect, an illuminated emblem for a steering wheel assembly is disclosed. The illuminated emblem includes a conductive plate having a generally U-shape and formed from an electrically conductive material; a light source coupled to a PCB, where the PCB is electrically coupled to the conductive plate such that an electrical signal is provided to the light source via the PCB; a base coupled to a frame of the steering wheel assembly, where the conductive plate is located between the base and the frame, the base having a generally U-shape and including an opening adjacent the light source for directing light emitted from the light source towards a U-shaped volume defined by the base; an outer cap coupled to the base through which light emitted from the light source is transmitted towards the user, the outer cap defining a volume between an inside surface of the outer cap and a top surface of the base; and a decorative emblem constructed from an at least partially translucent material, the decorative emblem located between the light source and a central axis of the steering wheel assembly.

In some embodiments, the decorative emblem is located on at least one of an outer surface of the outer cap and an inner surface of the outer cap.

In some embodiments, an optical film is disposed between the base and the light element, the optical film reflecting ambient light passing through the cap back such that the light source is not visible through the cap when not illuminated. The decorative emblem is located between the optical film and the central axis of the steering wheel assembly In some embodiments, the light source is located adjacent the optical film.

In some embodiments, the conductive plate is electrically coupled to a vehicle control system and operation of the light source is directed by operation instructions received from a vehicle control system.

In some embodiments, the operation instruction directs illumination of the light source to provide at least one of a decorative effect and provide vehicle information to the driver In another aspect, a method of assembling an illuminated emblem assembly for a steering wheel assembly is disclosed. The method includes coupling the illuminated emblem assembly to a frame of the steering wheel assembly, the illuminated emblem assembly including: a conductive plate configured to electrically coupled with a vehicle control system; a light source electrically coupled to the conductive plate; a base disposed on a top surface of the conductive plate and having a generally U-shape, the base including an opening adjacent the light source for directing light emitted from the light source towards a U-shaped volume defined by a top surface of the base; and an outer cap through which light is transmitted, the outer cap being disposed over the base and defining a volume between an inside surface of the outer cap and the base and/or optical film; and a cover extending around the base and an outer surface of the frame of a steering wheel assembly, where front and rear sidewalls of the cover each include a U-shaped edge that extends longitudinally along the cover, where the outer cap is disposed within the U-shaped edges of the cover. The method further includes molding a foam over a perimeter of the frame of the steering wheel assembly and at least a portion of the cover of the illuminated emblem assembly, and wrapping an outer skin around the foamed-over portion of the steering wheel assembly.

In some embodiments, assembling an illuminated emblem assembly includes coupling a collar trim between the U-shaped edges of the cover and an edge of the outer cap, where the collar trim is mechanically coupled to the cover, where the outer skin is wrapped around the is tucked into a space provided between the collar trim and the cover In some embodiments, the cover includes a back cover portion and a front cover portion. The back cover portion is disposed adjacent a rear surface of the frame of the rim of the steering wheel assembly and the front cover portion is disposed adjacent a front surface of the frame of the rim, wherein at least one of the back cover portion and the front cover portion include a fastener sized and configured to align with a corresponding opening defined in the frame, the fastener engaging through the opening to couple at least one back cover portion and front cover portion to the frame.

DETAILED DESCRIPTION

Figure 1:
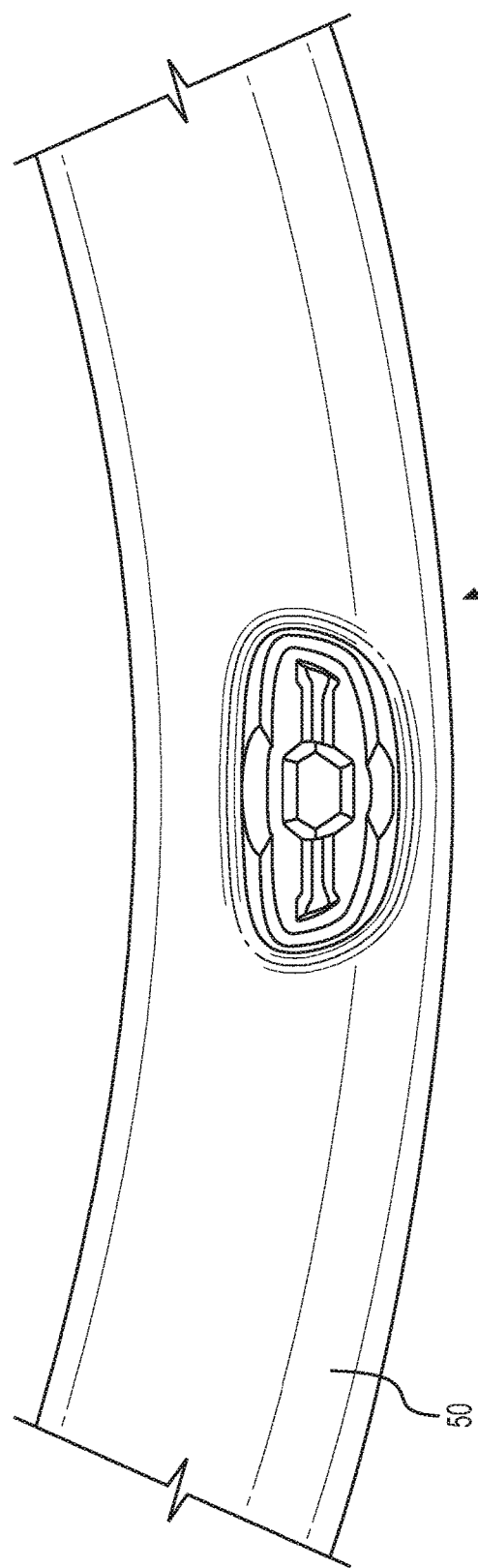
FIG. 1 illustrates an illuminated emblem assembly coupled to a rim of a steering assembly according to one implementation.
Figure 2:
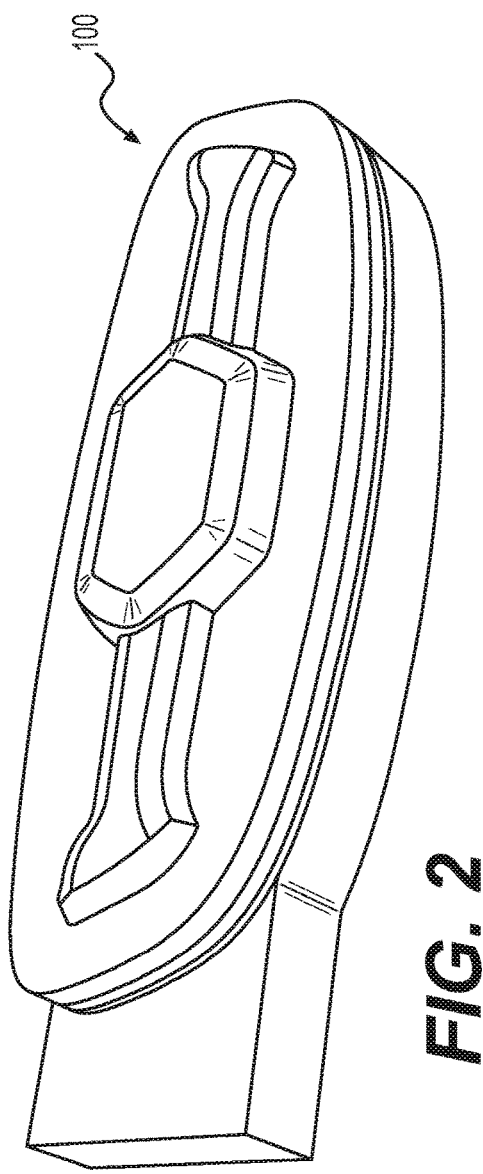
FIG. 2 illustrates a front perspective view of the illuminated emblem assembly of FIG. 1.

Various implementations include illumination systems, such as illuminated emblem assemblies that are coupled to a steering assembly. In some implementations, the illuminated emblem assembly is coupled to a rim of the steering assembly. For example, the illuminated emblem assembly may be coupled to the rim at a 6 o'clock location on the steering assembly rim.

Various implementations of the illuminated emblem assembly include an outer cap that includes a transparent and/or translucent portion through which light is emitted. The outer cap defines a volume into which light is emitted from one or more light sources (e.g., light emitting diodes (LEDs)). In some implementations, the outer cap includes glass or a plastic material (e.g., polycarbonate). The outer cap may be clear, colored, or patterned. The emblem is defined on a surface of the outer cap, according to some implementations. However, in other implementations, the emblem may be disposed in the volume and viewed through the outer cap. And, in some implementations, the assembly may not define an emblem and may be used to communicate with the operator or for decorative effect.

The illuminated emblem assembly also includes at least one circuit board to which the light source is coupled and at least one electrical connector for electrically coupling the circuit board and light source to a vehicle control system, according to various implementations.

In some implementations, the outer cap is flush with the rim of the steering assembly, and in other implementations, the outer cap extends radially inward or outward of a contour of the rim adjacent to the outer cap.

For example, FIGS. 1-3B illustrate one implementation of an illuminated emblem assembly. The illuminated emblem assembly 100 includes at least one printed circuit board (PCB) 102, at least one LED 104 coupled to the PCB 102, a light guide 106, a light diffusing film 110, an opaque plate 114 defining an opening 116, and an outer cap 118 from which an opaque emblem portion 122 extends.

The light guide 106 is generally planar and includes a transparent and/or translucent material that transmits light received by one surface through the light guide 106 and out of an outer surface 112 of the light guide 106. Example materials that may be used for the light guide 206 include polycarbonate, polycarbonate blends, acrylic, nylon, or other suitable materials. In addition, one or more surfaces of the light guide 106 may include a surface treatment, such as a plurality of micro lenses (e.g., V-shaped notches, embossed or debossed radial notches, or combination thereof), that directs light through the light guide 106 and/or the outer surface 112 thereof.

In the implementation shown in FIGS. 1-3B, the LED 104 is disposed adjacent an end side edge 108 of the light guide 106. The end side edge 108 lies in a plane that is transverse to the outer surface 112. However, in other implementations, the LED 104 is disposable adjacent any side edge or an inner surface of the light guide 106, wherein the inner surface is opposite and spaced apart from the outer surface 112, and the side edges extend between the inner surface and outer surface 112.

Figure 3A:
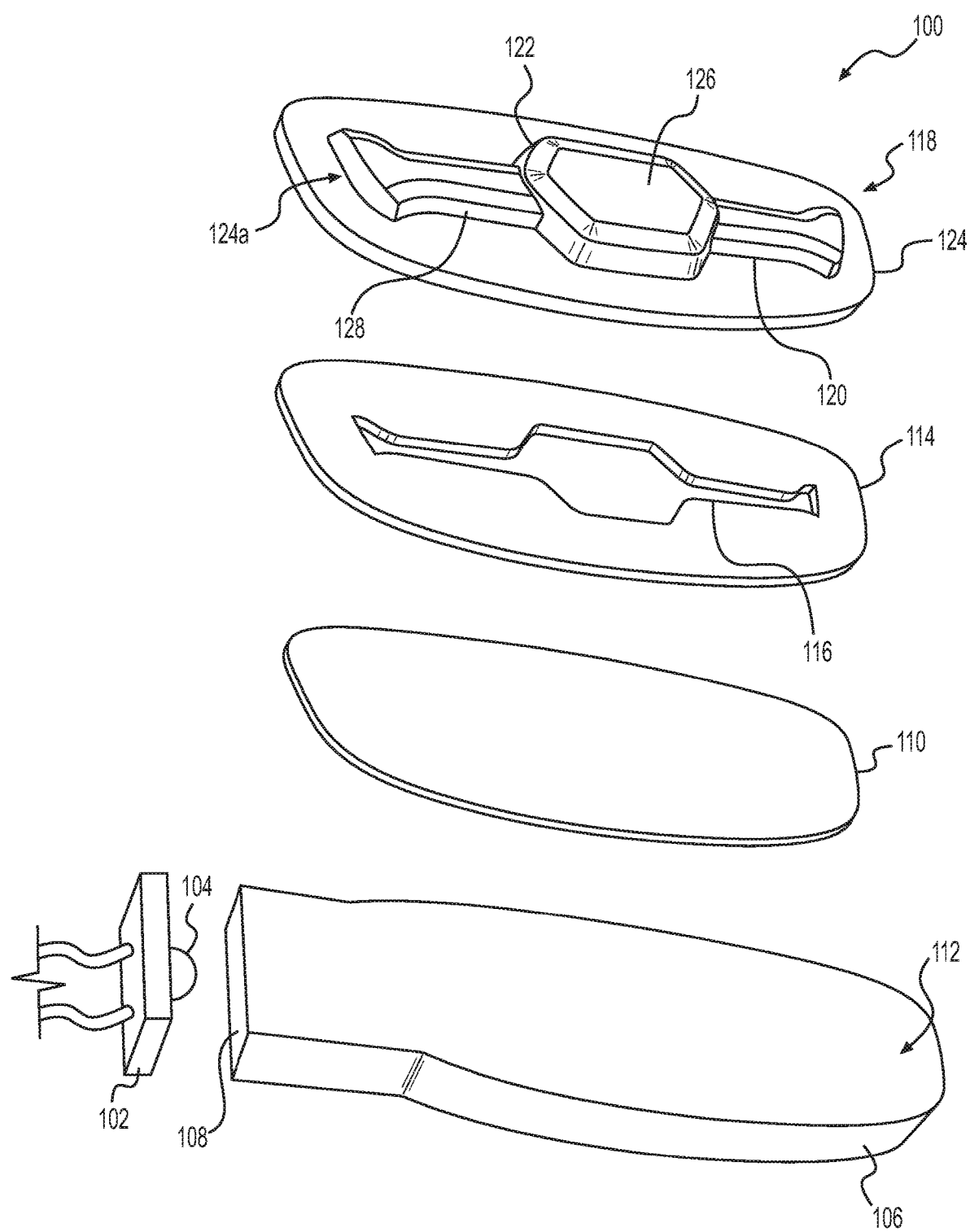
FIG. 3A illustrates an exploded view of the illuminated emblem assembly of FIG. 1.

The LED 104 is a top-firing LED that is disposed on a surface of PCB 102 as shown in FIG. 3A. The surface of the PCB 102 on which the LED 104 is disposed is arranged at an angle of about 90° to the outer surface 112 of the light guide 106. However, in other implementations, the LED may be side firing and may be arranged at an alternative, suitable angle relative to the outer surface 112 of the light guide 106. In addition, more than one LED may be arranged on the PCB, such as LEDs having different colors, which may be fired individually or two or more at a time.

The light diffusing film 110 is disposed on at least a portion of the outer surface 112 of the light guide 106. The light diffusing film 110 causes light being emitted from the outer surface 112 of the light guide 106 to be diffused before exiting an outer surface of the film 110.

Figure 3B:
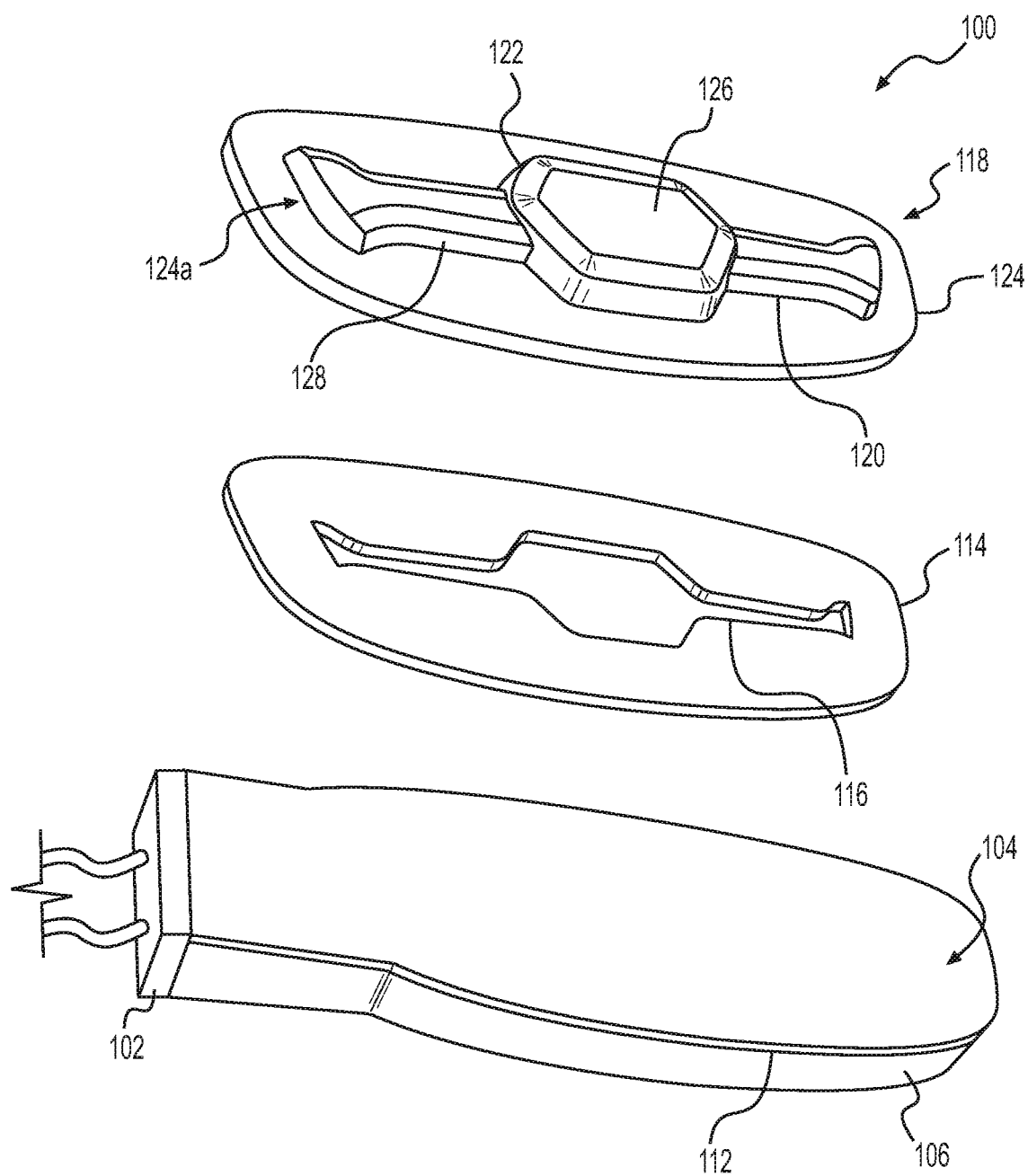
FIG. 3B illustrates an exploded view of the illuminated assembly of FIG. 1 utilizing an OLED/electroluminescent panel.
Figure 4A:
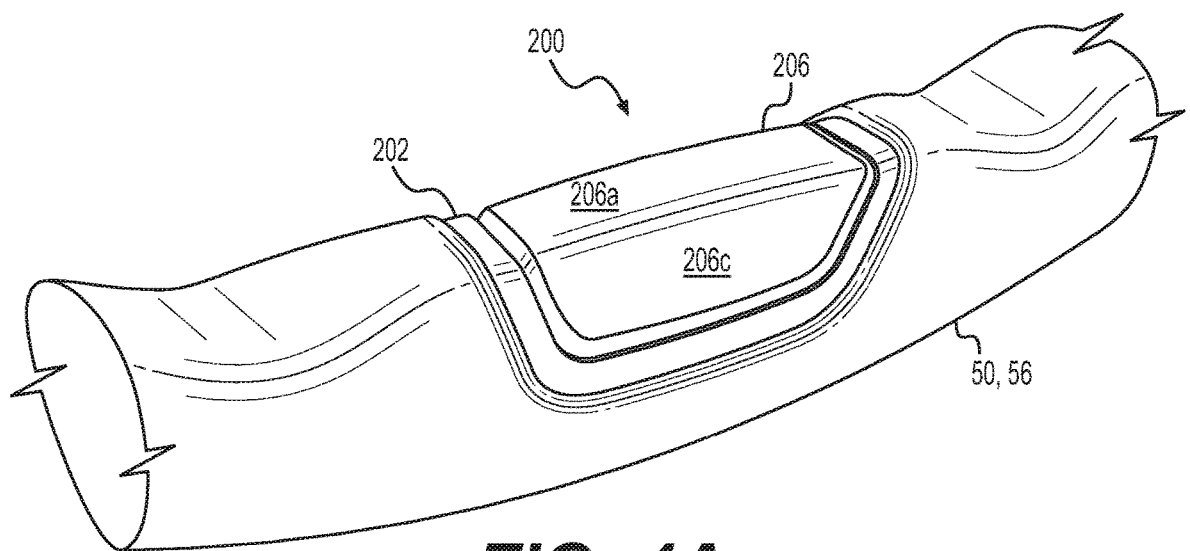
FIGS. 4A and 4B illustrate rear and front perspective views, respectively, of an illuminated emblem assembly coupled to a rim of a steering assembly according to another implementation.
Figure 4B:
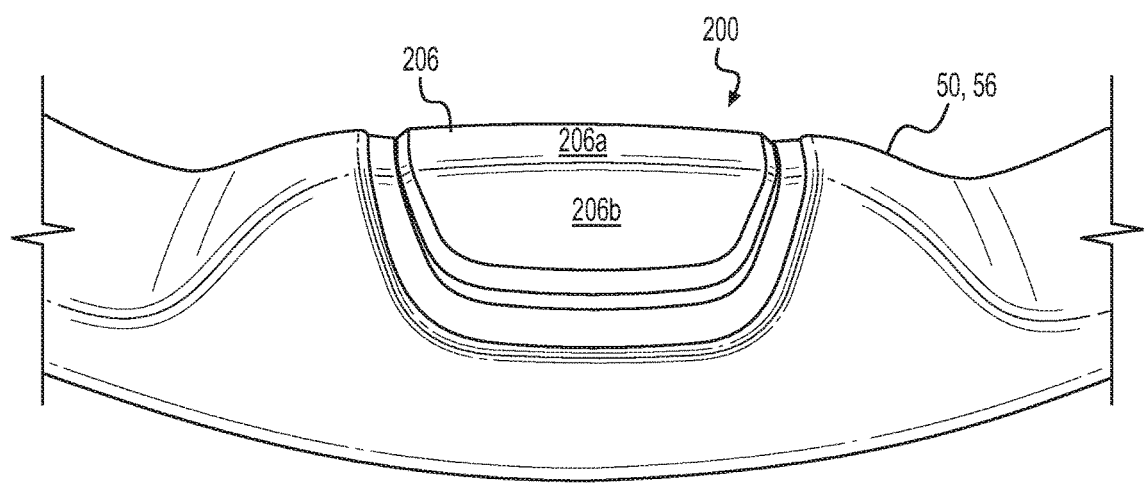
Figure 5A:
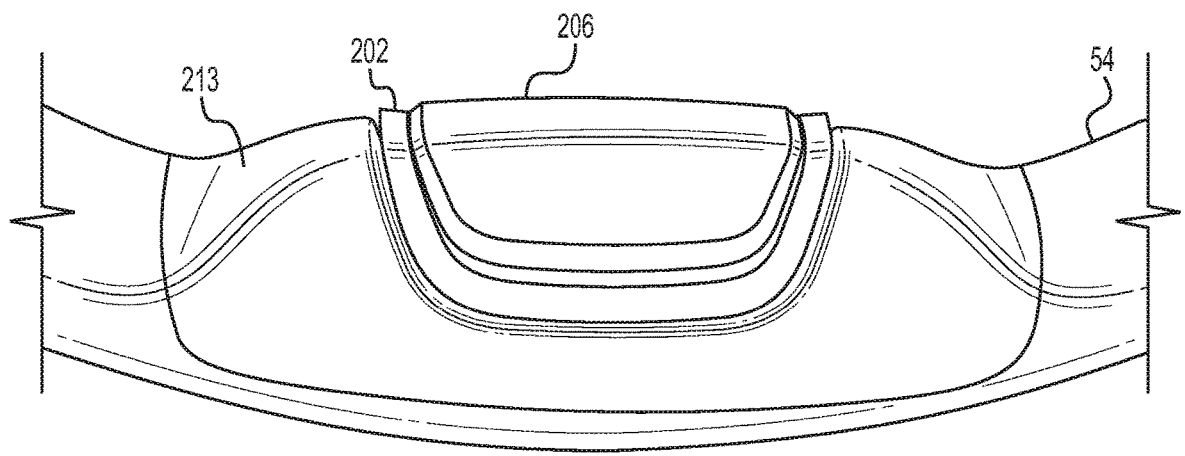
FIG. 5A illustrates the illuminated emblem assembly of FIGS. 4A and 4B coupled to the rim with the skin of the steering assembly removed.
Figure 5B:
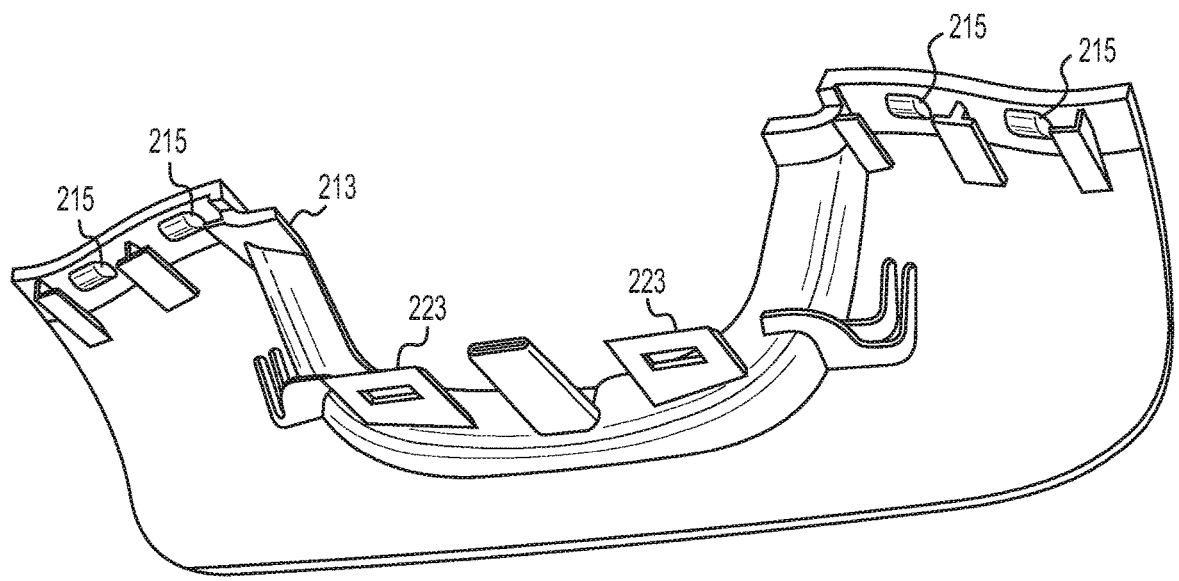
FIG. 5B illustrates an inner surface of a front cover of the illuminated emblem assembly shown in FIG. 5A.
Figure 6:
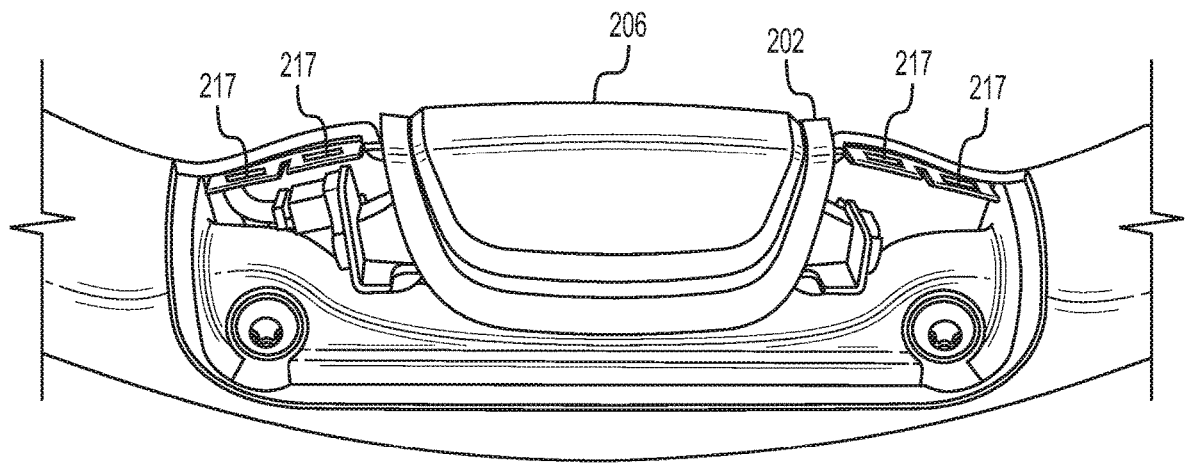
FIG. 6 illustrates the illuminated emblem assembly of FIGS. 4A and 4B coupled to the rim with the front cover removed.
Figure 7:
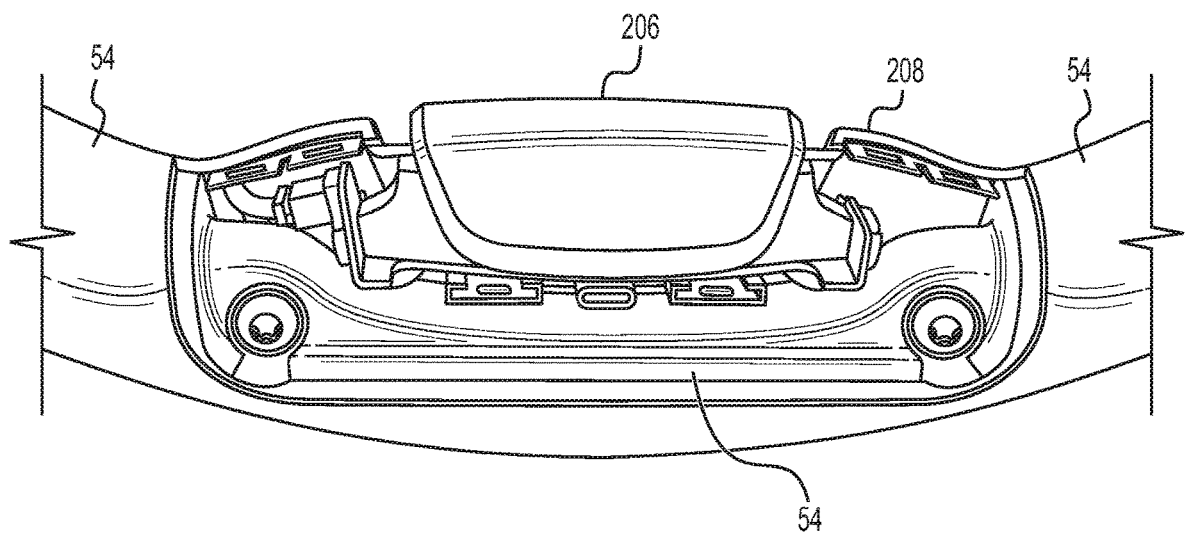
FIG. 7 illustrates the illuminated emblem assembly of FIGS. 4A and 4B coupled to the rim with a trim collar and the front cover of the illuminated emblem assembly removed.
Figure 8:
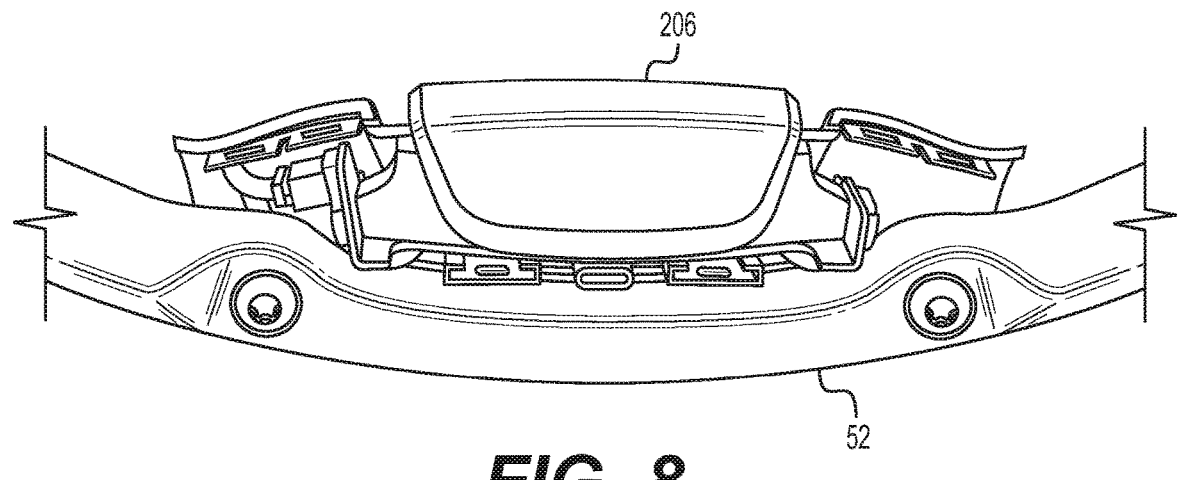
FIG. 8 illustrates the illuminated emblem assembly of FIGS. 4A and 4B coupled to the rim with the trim collar and the front cover of the illuminated emblem assembly removed and the foam of the steering assembly removed.
Figure 9:
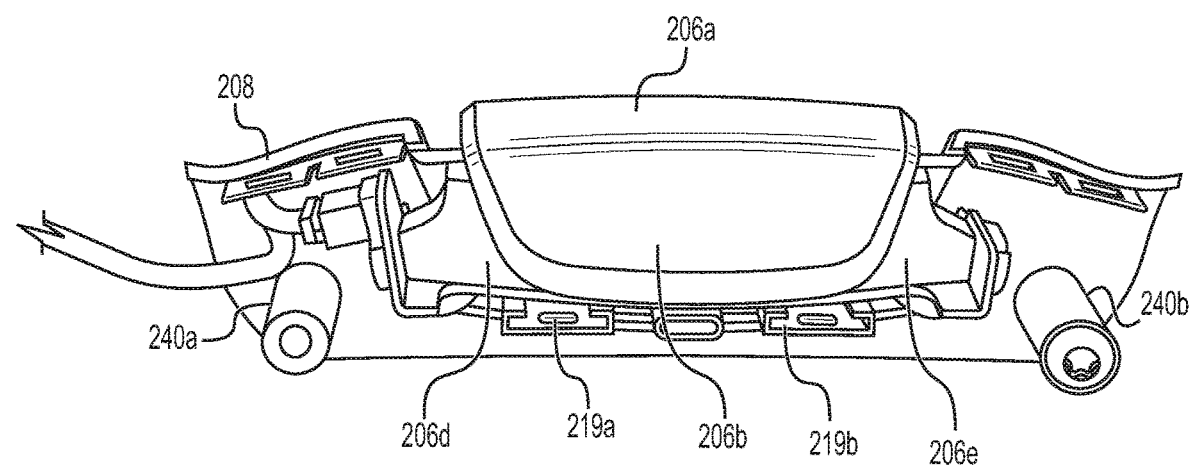
FIG. 9 illustrates the illuminated emblem assembly of FIGS. 4A and 4B with the trim collar and the front cover of the illuminated emblem assembly removed.
Figure 10:
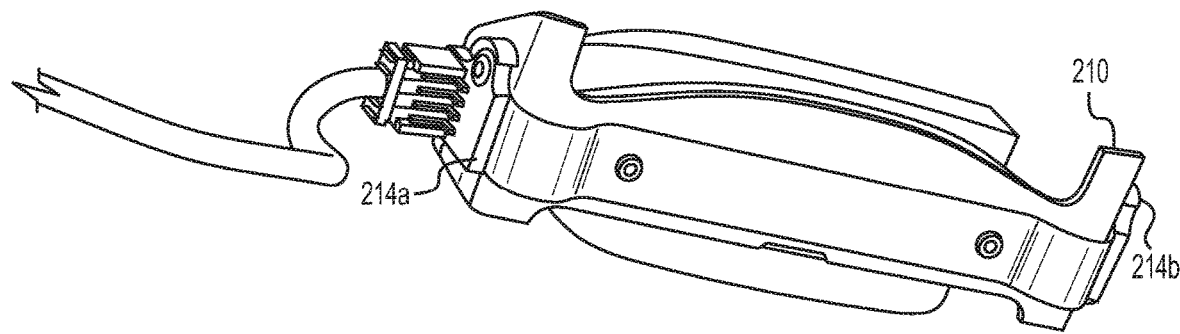
FIG. 10 illustrates an inner perspective view of the illuminated emblem assembly of FIGS. 4A and 4B with the trim collar, front cover, and back cover of the illuminated emblem assembly removed.
Figure 11:
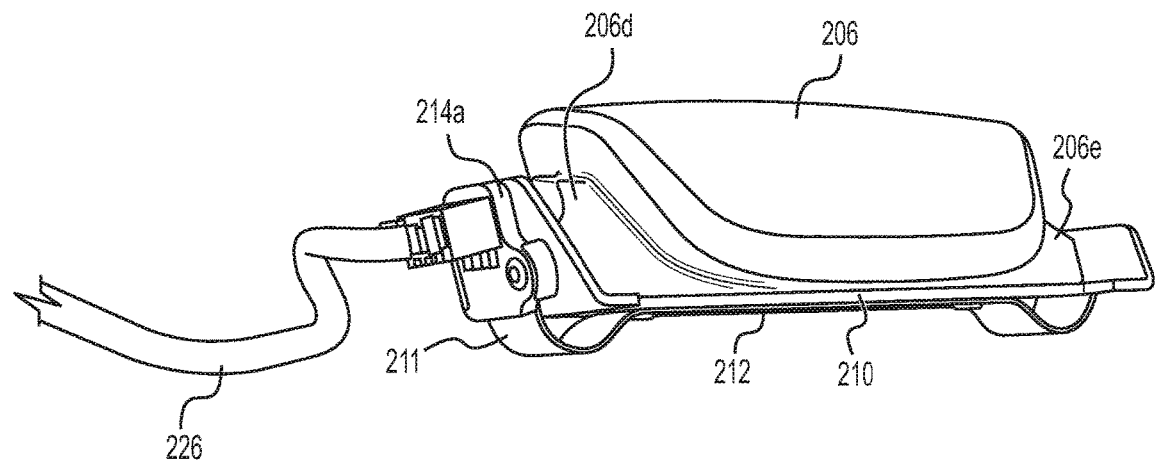
FIG. 11 illustrates a front perspective view of the illuminated emblem assembly of FIGS. 4A and 4B with the trim collar, front cover, and back cover of the illuminated emblem assembly removed.
Figure 12:
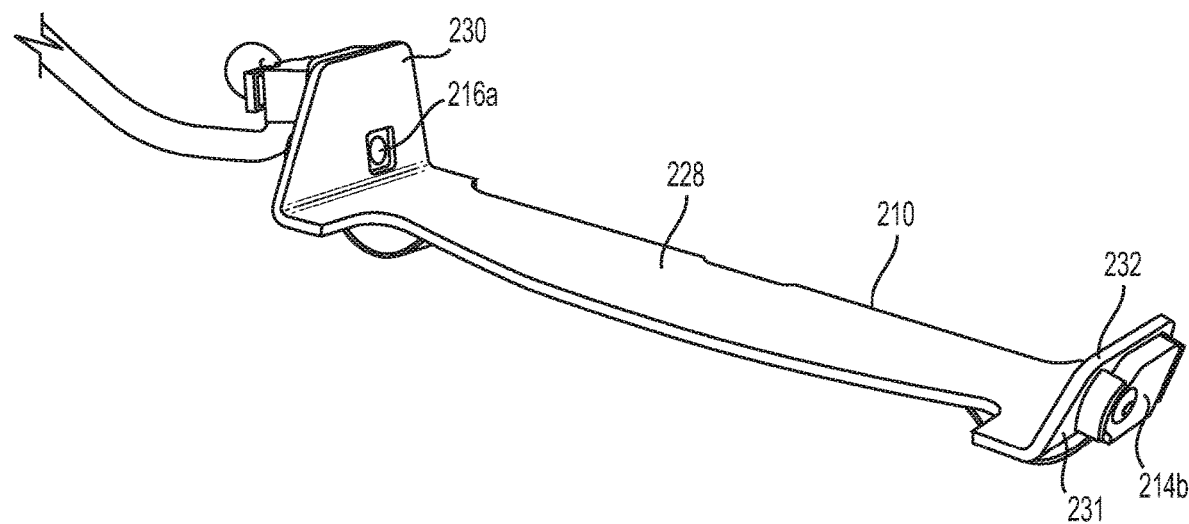
FIG. 12 illustrates a front perspective view of a base and conductive plate of the illuminated emblem assembly of FIGS. 4A and 4B and LEDs coupled to printed circuit boards coupled to the conductive plate.
Figure 13:
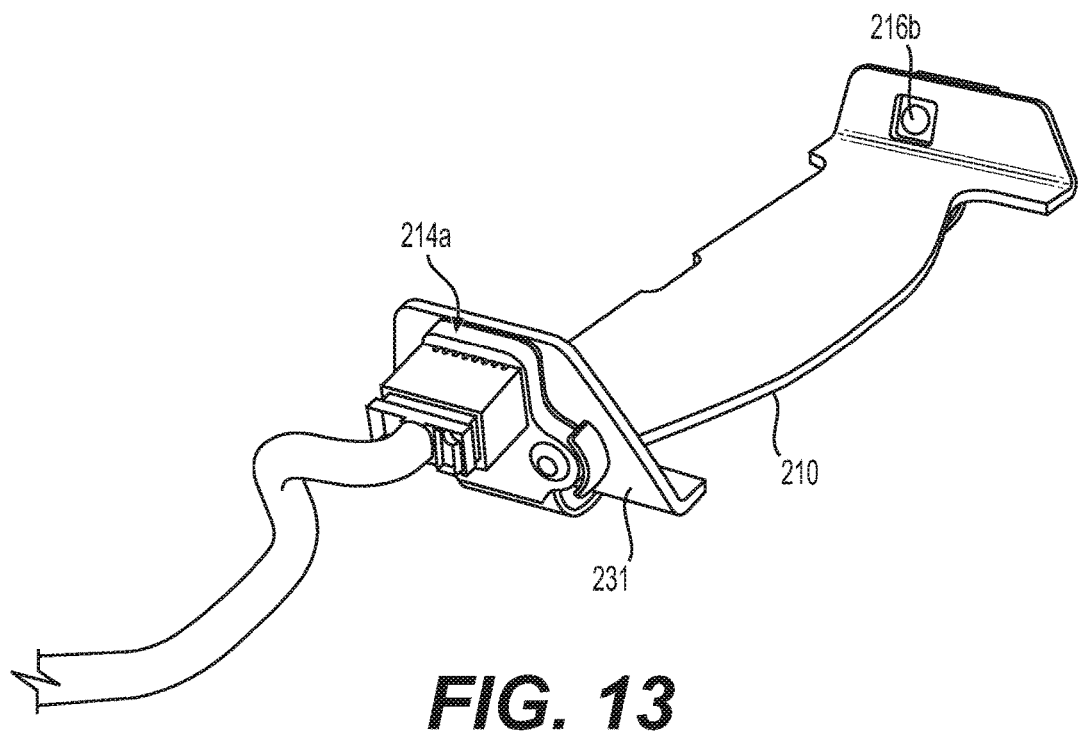
FIG. 13 illustrates an end perspective view of the base and conducive plate shown in FIG. 12.
Figure 14:
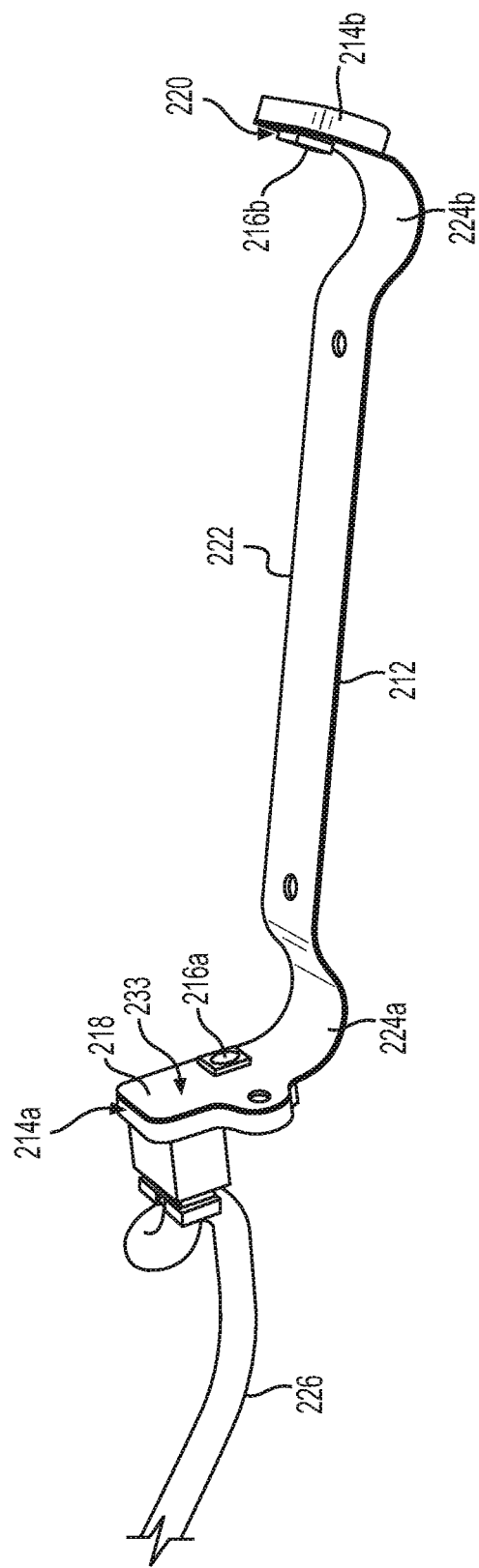
FIG. 14 illustrates a front perspective view of the conductive plate shown in FIG. 12.
Figure 15:
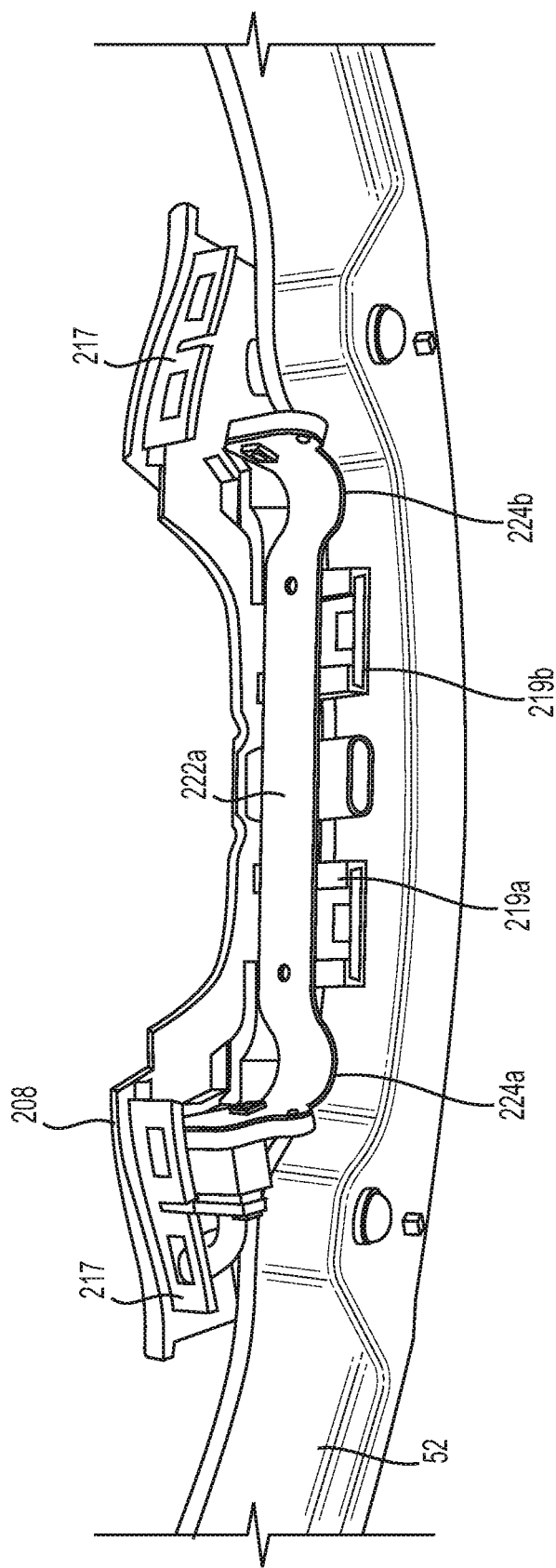
FIG. 15 illustrates a top perspective view of the conductive plate shown in FIG. 12 and back plate shown in FIGS. 6-9.
Figure 16:
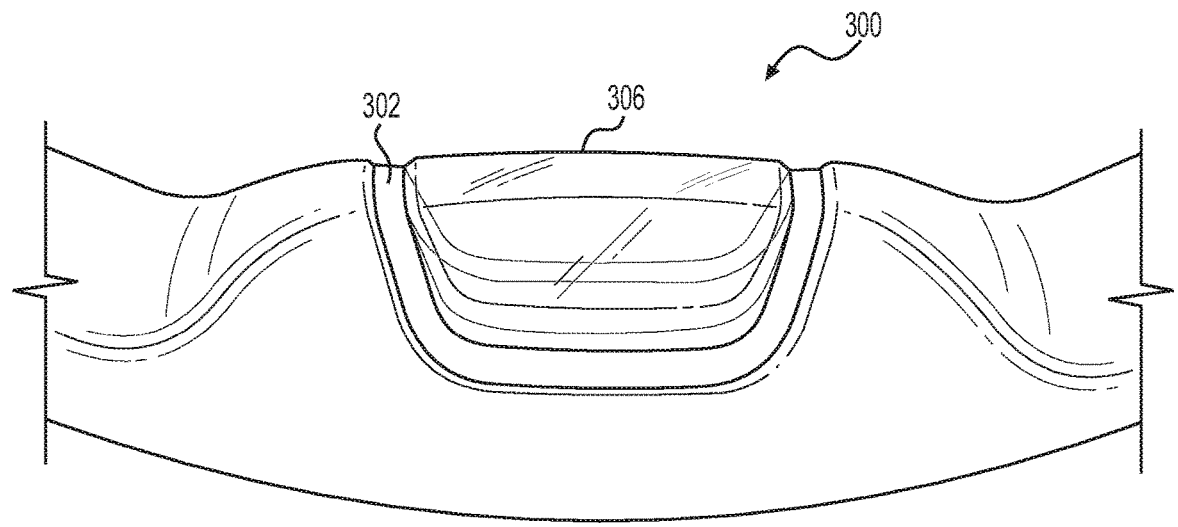
FIG. 16 illustrates an illuminated emblem assembly coupled to a rim of a steering assembly according to another implementation.
Figure 17:
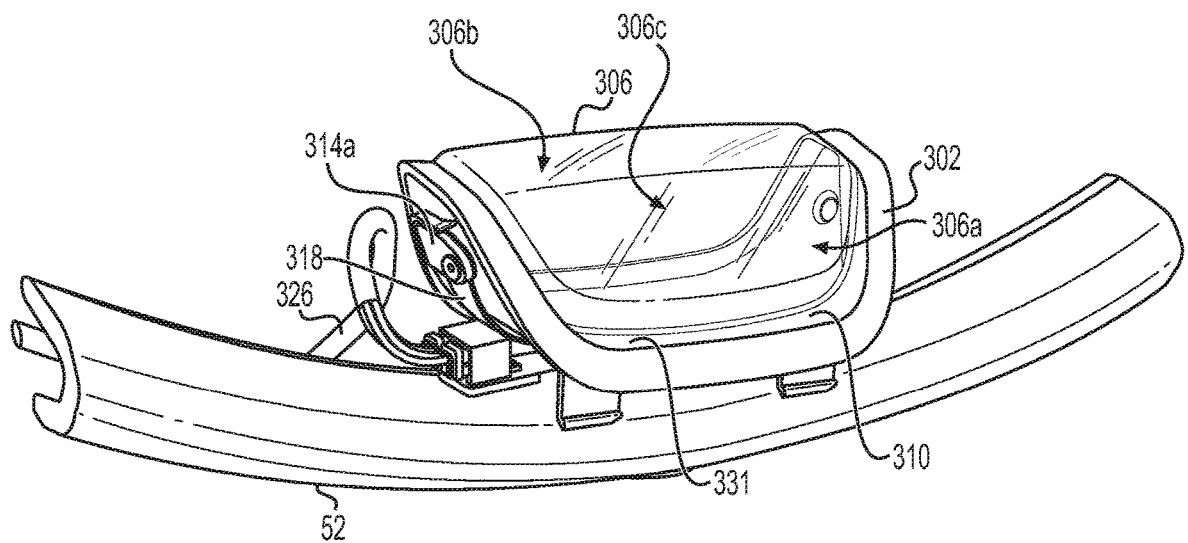
FIG. 17 illustrates the illuminated emblem assembly of FIG. 16 with a foam of the steering assembly removed.
Figure 18:
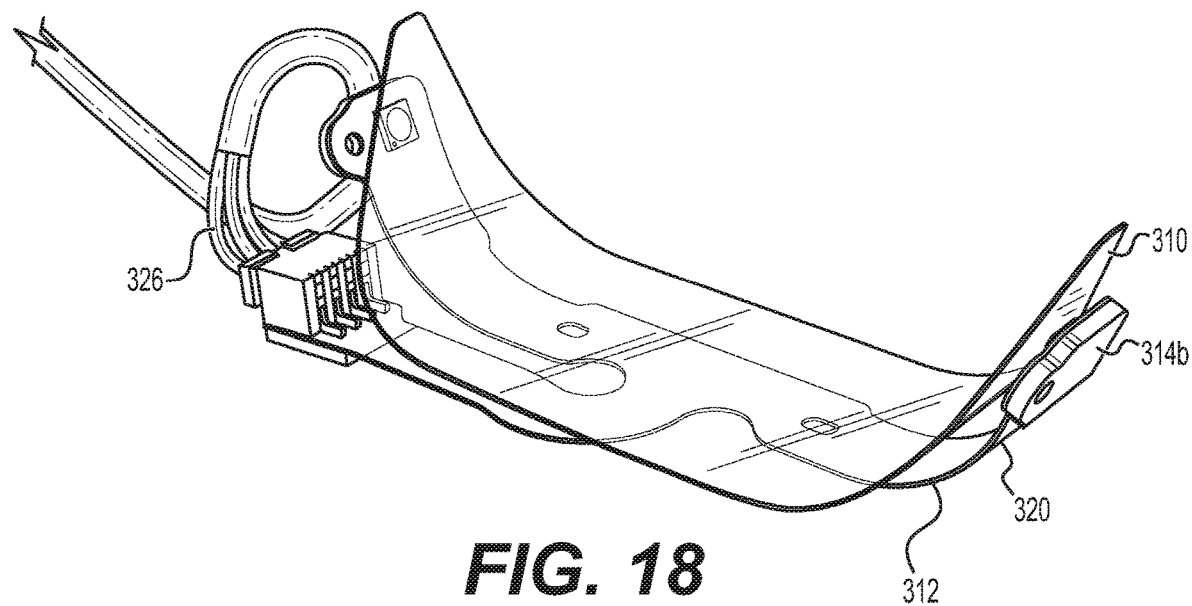
FIG. 18 illustrates the illuminated emblem assembly of FIG. 16 with an outer cap of the illuminated emblem assembly removed.
Figure 19:
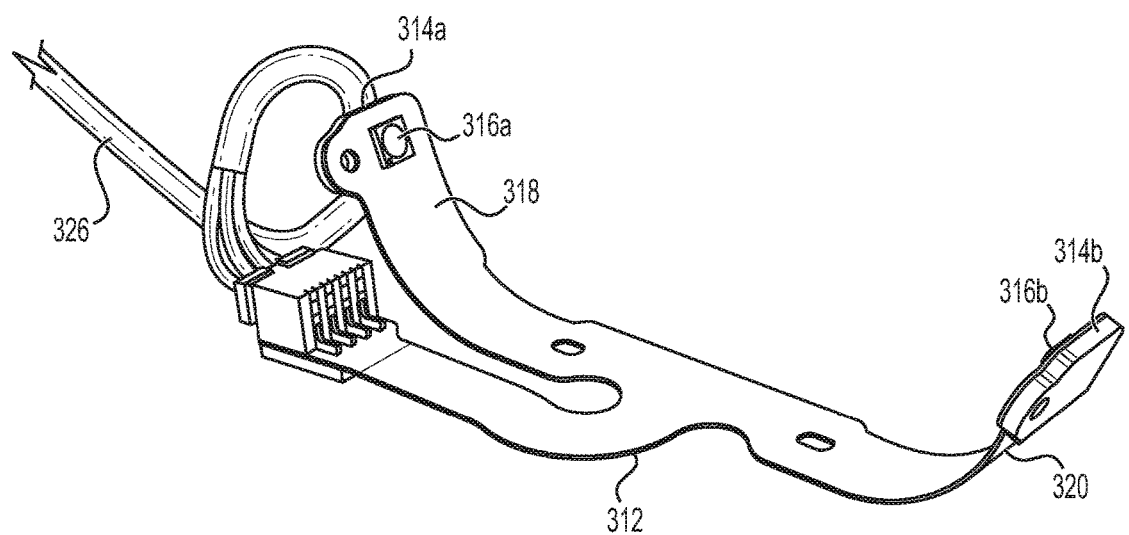
FIGS. 19 and 20 illustrate perspective views of a conductive plate of the illuminated emblem assembly of FIG. 16.
Figure 20:
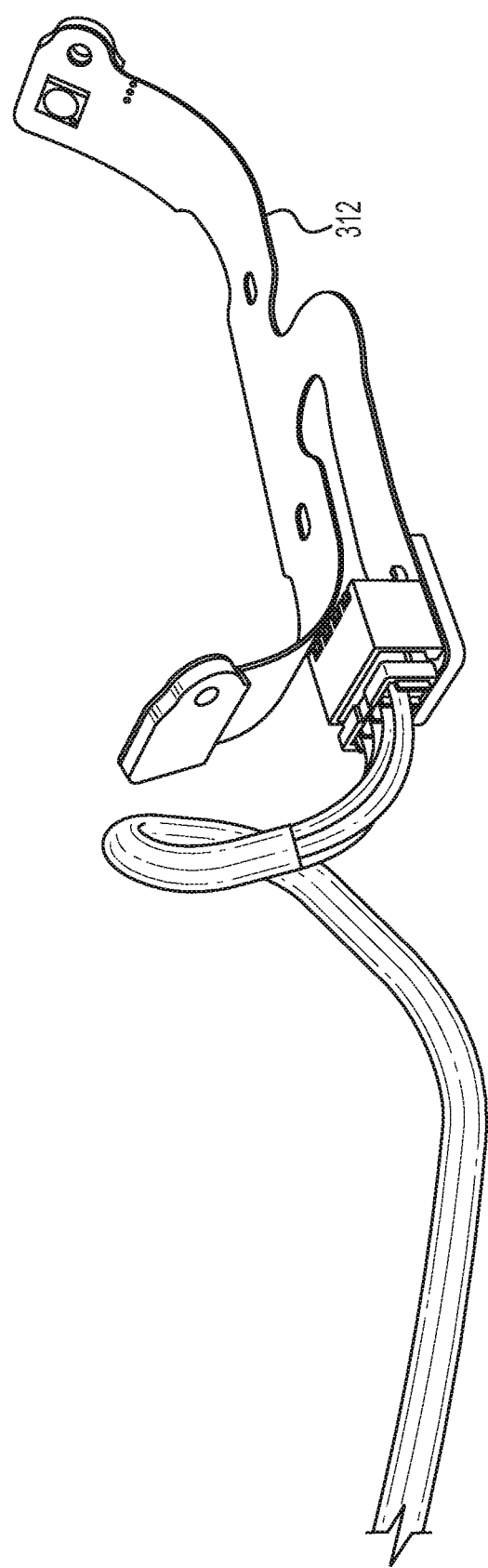
Figure 21:
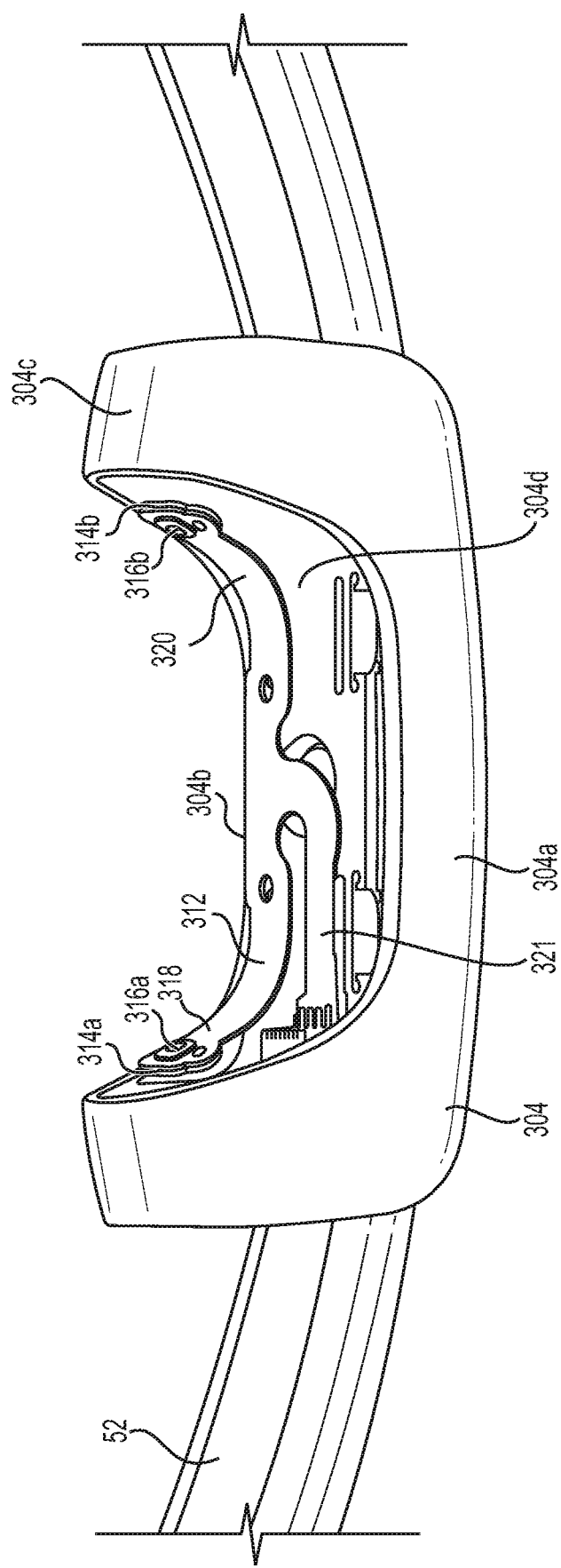
FIG. 21 illustrates a perspective view of a U-shaped base and conductive plate shown in FIGS. 16-20.

As illustrated in FIG. 3B, LED 104 can also include an organic light emitting diode (OLED) and/or electroluminescent panel. The OLED/electroluminescent panel provides a surface area light source where light is produced by exciting an electroluminescent phosphor, typically by an electric field. OLED/electroluminescent panel is capable of producing uniform light in several colors (e.g., white, yellow, green, blue), depending on the particular phosphor used. In general, a suitable phosphor is placed between two metallic sheet surfaces forming two electrode layers. An alternating current applied to the electrode layers excites the phosphor material to produce light. The OLED/electroluminescent panel can be formed from an elongate, flexible strip of laminated material adaptable for use in many different shapes and sizes. Similar to a top-firing LED, the OLED/electroluminescent panel can be coupled to a surface of the light guide 106. As illustrated in FIG. 3B, the OLED/electroluminescent panel is disposed adjacent the outer surface 112 of the light guide 106.

The opaque plate 114 is disposed over the light diffusing film 110 and the portion of the outer surface 112 of the light guide 106. The opaque plate 114 defines an opening 116 through which light exiting the light diffusing film 110 passes. Light is prevented from passing through the opaque plate 114 outside of the opening 116.

The outer cap 118 includes a plate 124 and an emblem portion 122 that extends from an outer surface 124a of the plate 124. An inner surface of the emblem portion 122 is spaced apart from a plane that includes the outer surface 124 of the plate 124 to define a volume.

The outer cap 118 is disposed over the opaque plate 114. A shape of the opening 116 in the opaque plate 114 corresponds to a shape of the emblem portion 122 to be illuminated. In this implementation, a perimeter of the opening 116 is radially inset relative to a perimeter 120 of the emblem portion 122. Light from the light guide 106 is emitted through the film 110, the opening 116, and into the volume defined by the emblem portion 122.

The emblem portion 122 includes an opaque portion 126 and a transparent and/or translucent portion 128. The opaque portion 126 is an outer surface that is spaced apart from the outer surface 124a of the plate 124. The transparent and/or translucent portion 128 extends between the opaque portion 126 and the outer surface 124a of the plate 124. Light emitted through the transparent and/or translucent portion 128 causes the opaque portion 126 to appear to be backlit.

The assembly 100 may further include a housing for coupling the assembly 100 to a frame 52 of the rim 50, according to some implementations. And, in various implementations, the assembly 100 is coupled to the frame 52 using adhesive, clips, fasteners, snaps, or other suitable fastening mechanisms.

FIGS. 4A-15 illustrate an illuminated emblem assembly 200 according to another implementation. The illuminated emblem assembly 200 is coupled to a rim 50 of a steering assembly as shown. The rim 50 includes a frame 52, a foam 54 molded over the frame 52, and an outer skin 56, or trim, wrapped around the foam 54.

The illuminated emblem assembly 200 includes a conductive plate 212, at least one PCB 214, at least one LED 216, a base 210, a back cover 208, a front cover 213, an outer cap 206, and a trim collar 202.

The conductive plate 212 is an elongated plate formed from an electrically conductive material (e.g., metal). The conductive plate 212 includes a first end portion 218 lying in a first plane, a second end portion 220 opposite and spaced apart from the first end portion 218 that lies in a second plane, and an intermediate portion 222 that extends between the end portions 218, 220. At least a portion of the intermediate portion 222 lies in a third plane that is transverse to the first and second planes.

Figure 22:
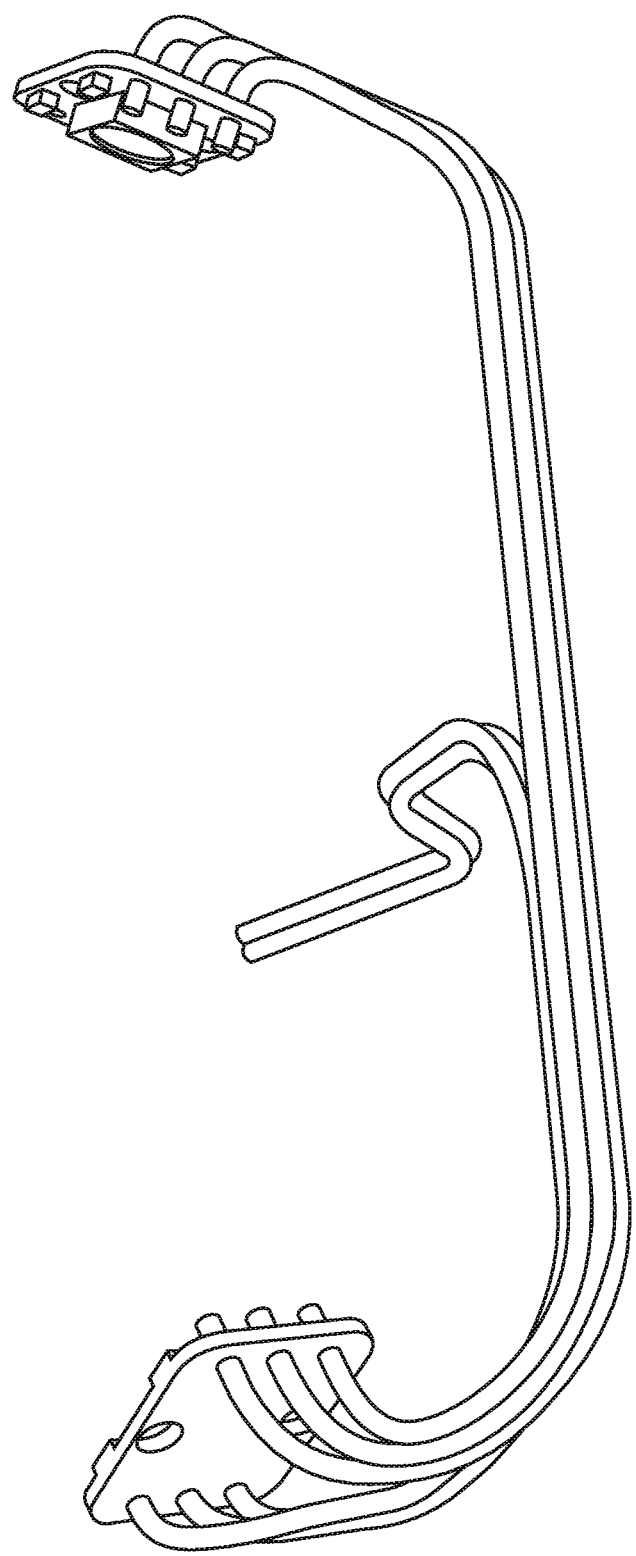
FIG. 22 illustrates an alternative wiring arrangement to the conductive plates described in relation to FIGS. 4A-21.
Figure 23:
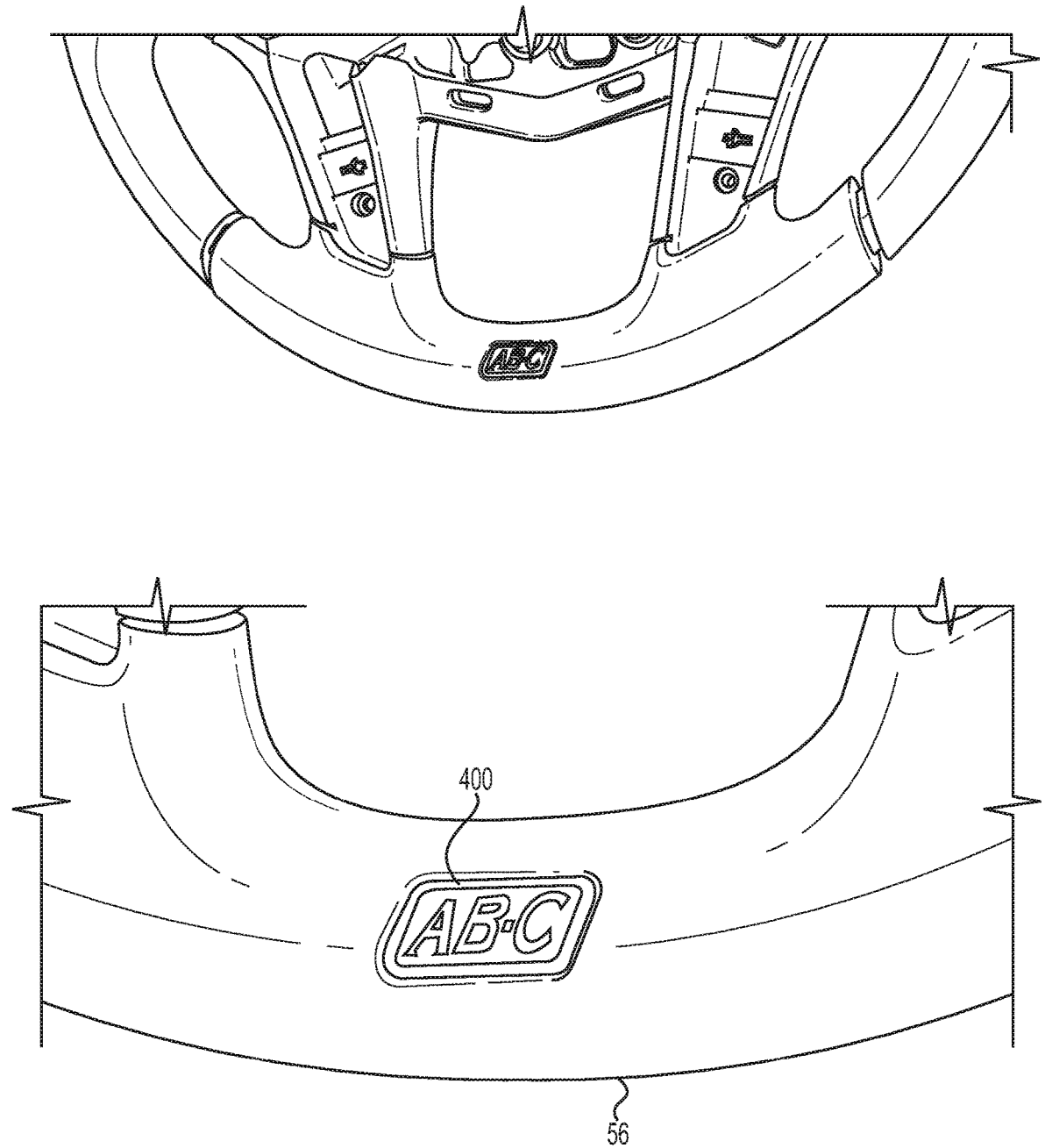
FIG. 23 illustrates an illuminated emblem assembly coupled to a rim of a steering assembly according to another implementation.
Figure 24:
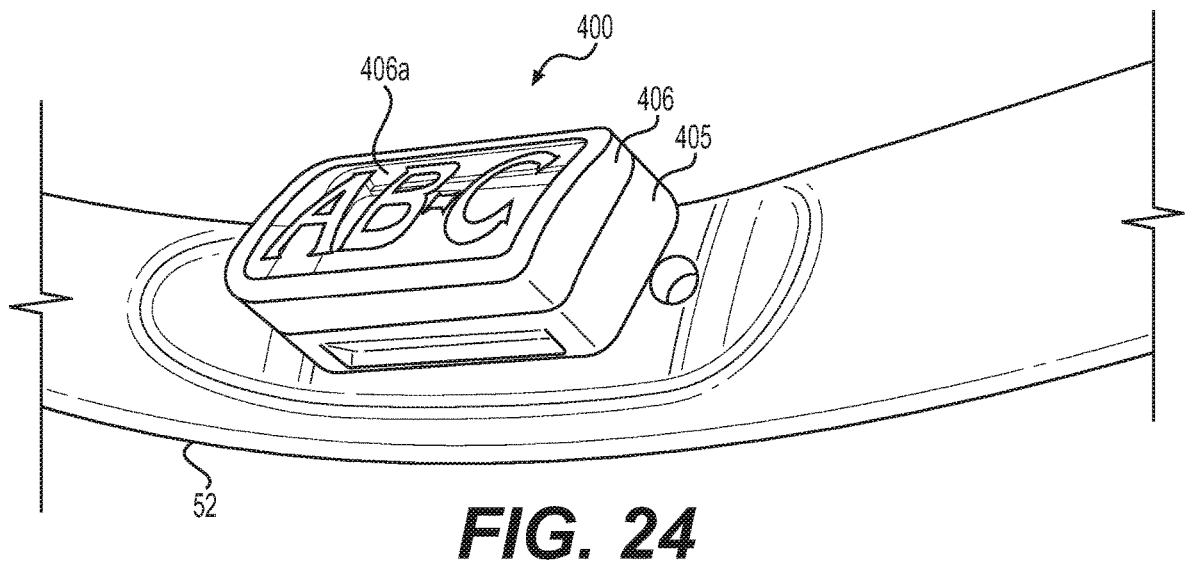
FIGS. 24-26 illustrate perspective views of the illuminated emblem assembly shown in FIG. 23 coupled to the rim of the steering assembly.
Figure 25:
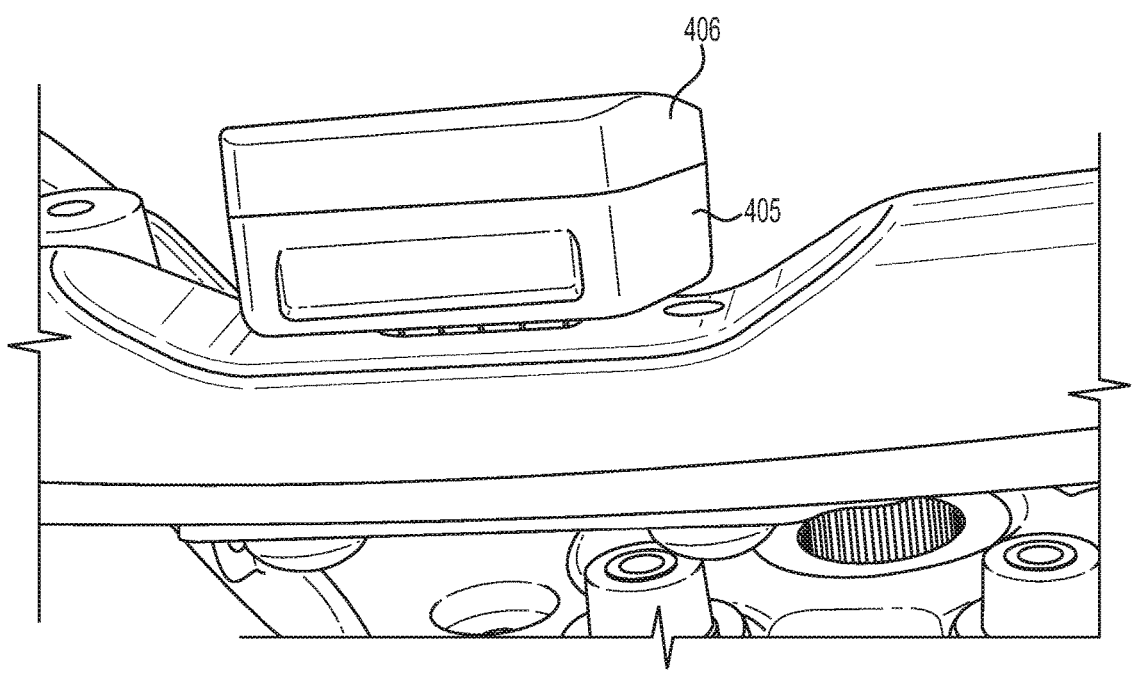
Figure 26:
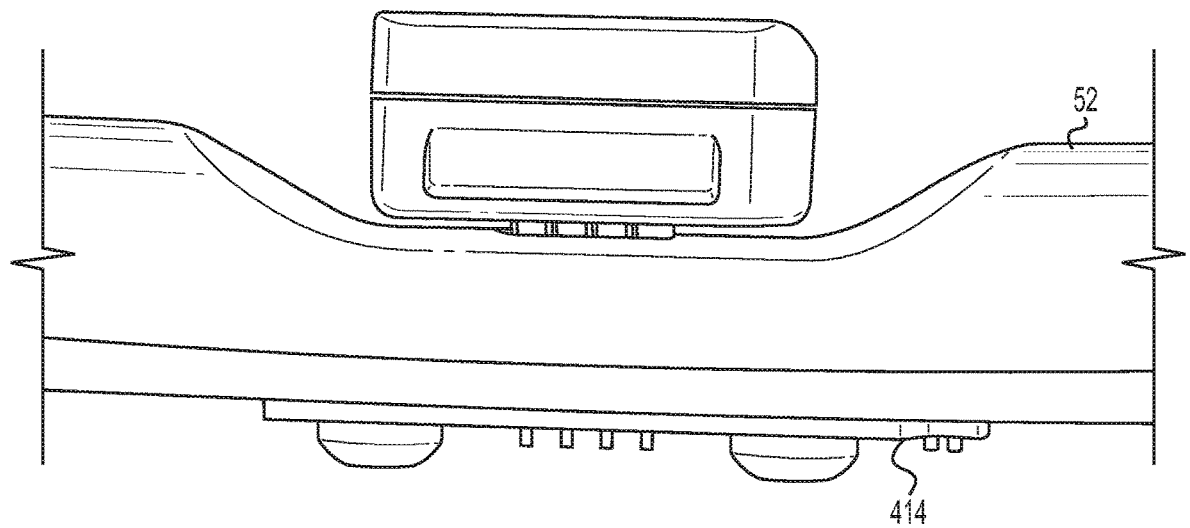
Figure 27:
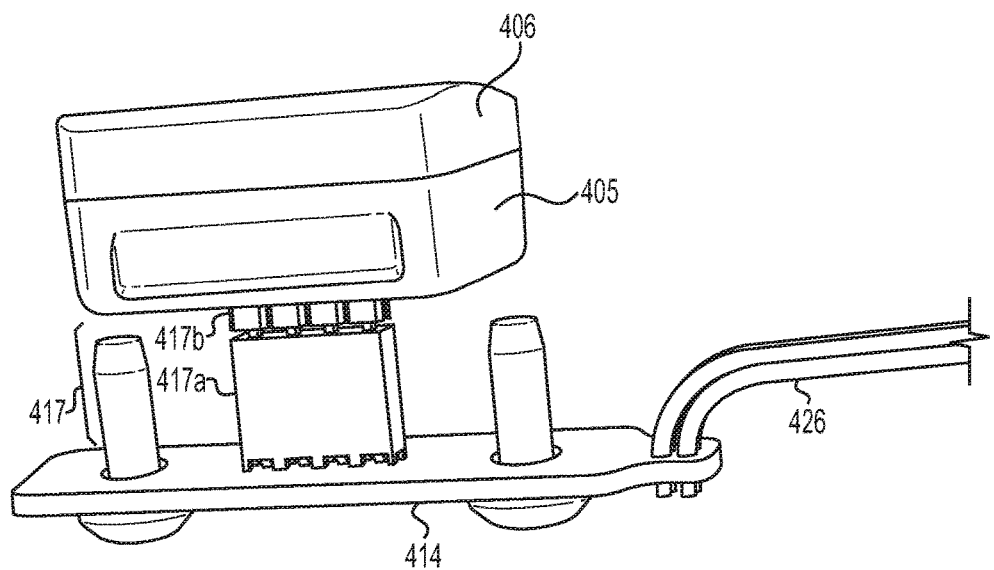
FIG. 27 illustrates a side perspective view of the illuminated emblem assembly shown in FIG. 23.
Figure 28:
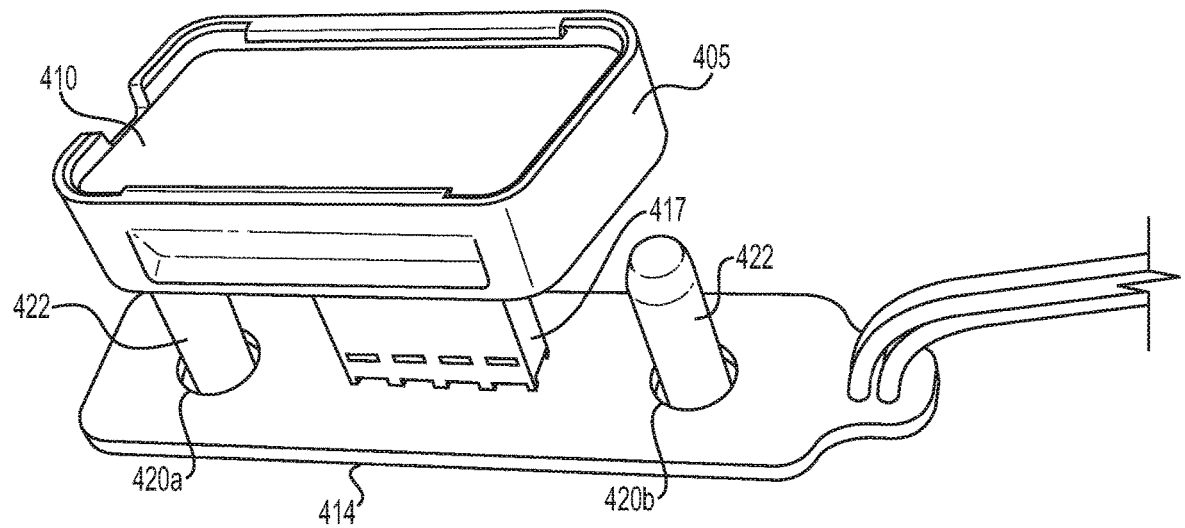
FIG. 28 illustrates a front perspective view of the illuminated emblem assembly shown in FIG. 23 with an outer cap of the illuminated emblem assembly removed.
Figure 29:
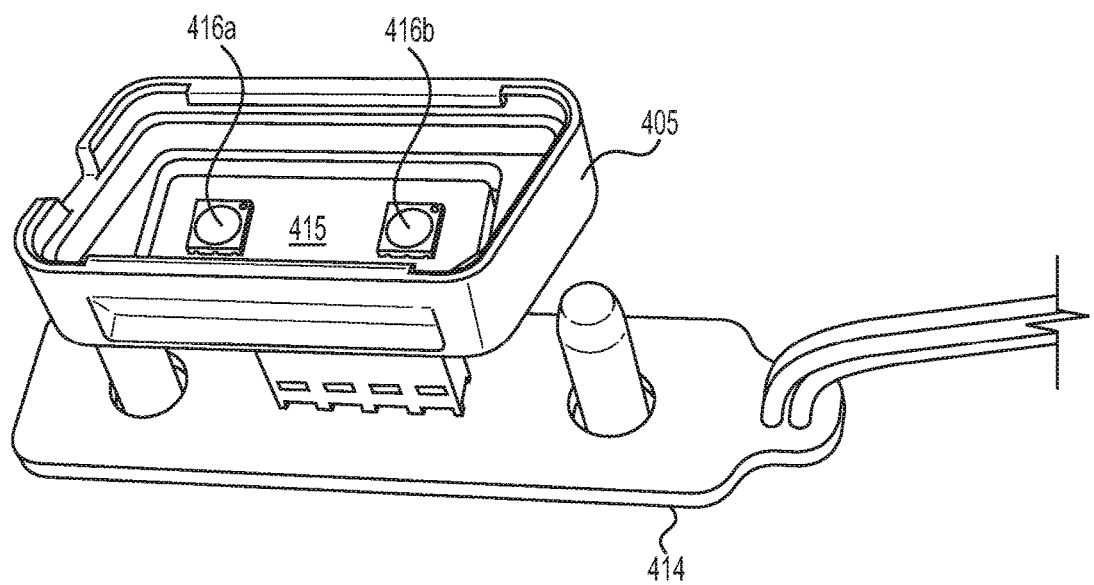
FIG. 29 illustrates a front perspective view of the illuminated emblem assembly shown in FIG. 23 with the outer cap and light diffusing film removed.
Figure 30:
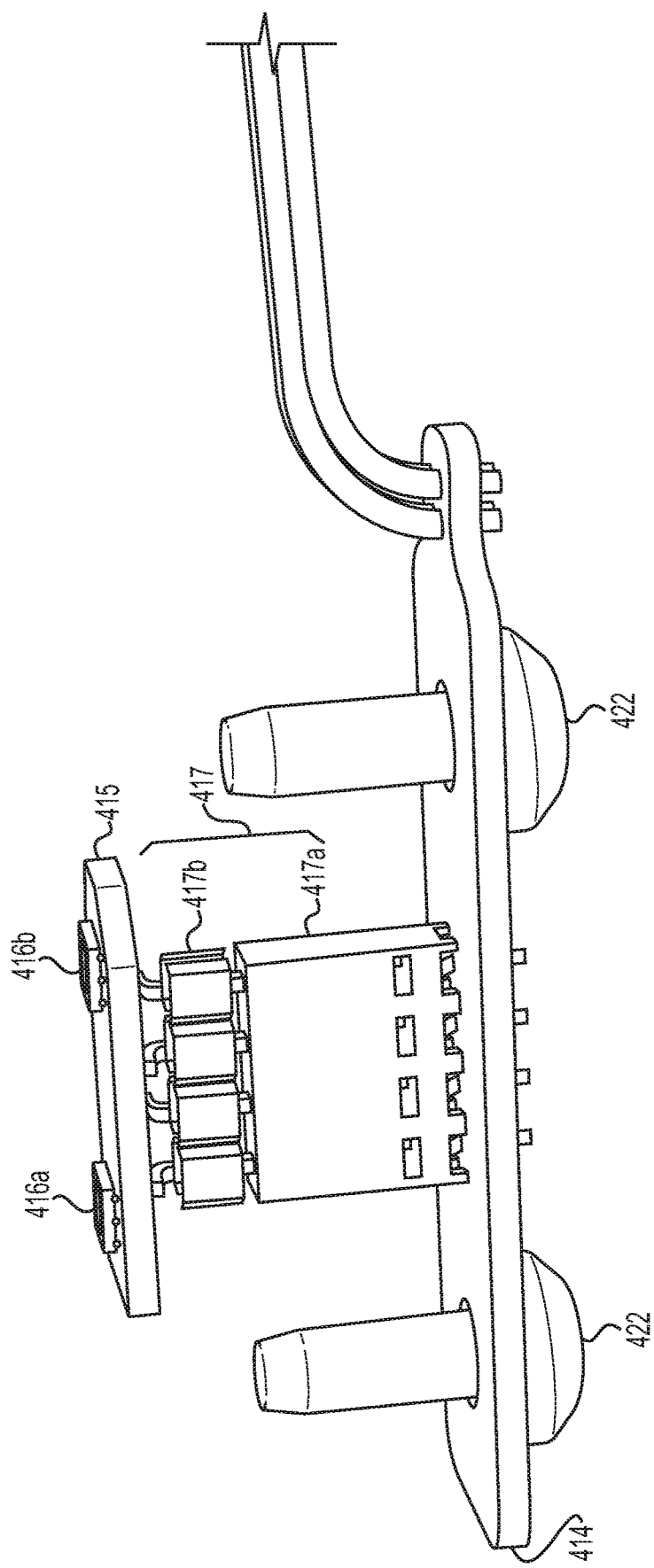
FIG. 30 illustrates a side perspective view of the illuminated emblem assembly shown in FIG. 23 with the outer cap, light diffusing film, and housing removed.
Figure 31:
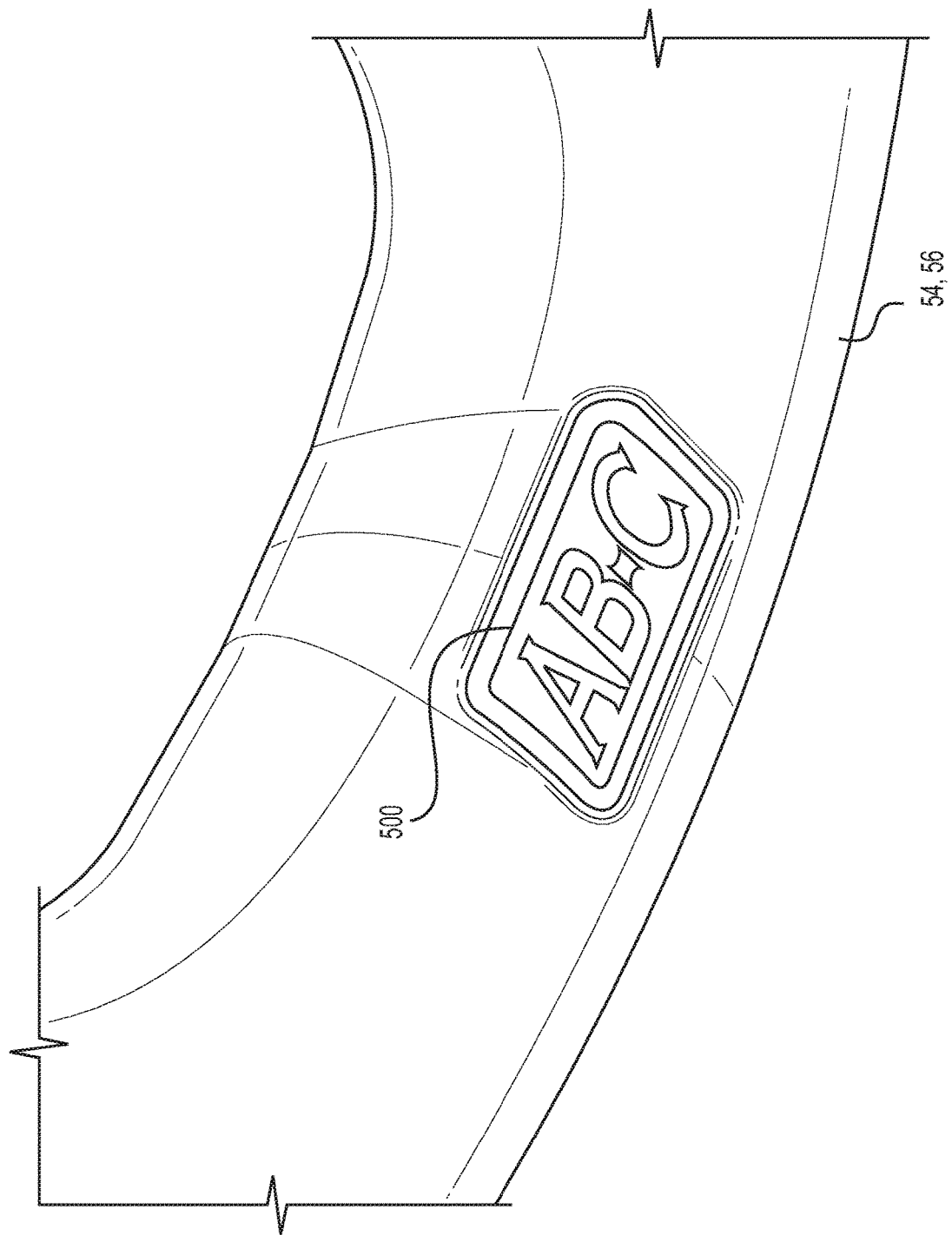
FIG. 31 illustrates an illuminated emblem assembly coupled to a rim of a steering assembly according to another implementation.

The at least one PCB 214 and at least one LED 216 include a first PCB 214a and first LED 216a coupled to end portion 218 and a second PCB 214b and second LED 216b coupled to end portion 220. PCBs 214a and 214b are electrically coupled to first surfaces 211 of the end portions 218, 220, respectively. And, the LEDs 216a, 216b are coupled to the PCBs 214a, 214b, respectively, and extend through openings defined through each end portion 218, 220, respectively, such that light from the LEDs 216a, 216b is emitted toward second surfaces 233 of each end portion 218, 220 and the intermediate portion 222. The conductive plate 212 is electrically coupled to a power source (e.g., via wire 226) to provide power to the PCBs 214a, 214b. In alternative implementations, the conductive plate 212 may be replaced with an alternative wiring arrangement, such as is shown in FIG. 22.

The base 210 includes an intermediate portion 228 and first 230 and second end portions 232. The end portions 230, 232 extend in planes that are transverse to the plane through which at least a portion of the intermediate portion 228 extends. First surfaces 231 of end portions 230, 232 abut second surfaces 233 of end portions 218, 220 of the conductive plate 212, respectively, and the intermediate portion 228 is coupled to the intermediate portion 222 of the conductive plate 212 (e.g., using rivets, screws, clips, adhesives, or other suitable fastening mechanism). The end portions 230, 232 define openings through which the LEDs 216a, 216b, respectively, can extend or through which light from the LEDs 216a, 216b can travel. The base 210 is formed from a non-conductive material (e.g., ceramic, plastic).

The back cover 208 is disposed adjacent a rear surface of the frame 52 of the rim 50, wherein the rear surface of the frame refers to the side of the frame 52 that faces the dashboard of a vehicle, away from an operator. The back cover 208 defines a central U-shaped opening adjacent which a rear side 206c of the outer cap 206 is disposed. Tabs 219a, 219b extend from an edge of the central U-shaped opening. Tabs 217 extend from an inner edge of the back cover 208 (inner edge referring to an inner radial edge of the back cover 208 that is nearest a central axis about which the rim 50 rotates). In addition, bosses 240a, 240b that define openings extend from the back cover 208. The bosses 240a, 240b are aligned with openings 234a, 234b defined in the frame 52, respectively, and a fastener is engaged through each set of openings to couple the back cover 208 to the frame 52.

The intermediate portion 222 defines locating portions 224a, 224b that extend from the third plane and are spaced apart along an axis extending along the intermediate portion 222 between the first and second planes. The portion 222a of the intermediate portion 222 between the locating portions 224a, 224b is disposed on the tabs 219a, 219b that extend from the back cover 208, and the locating portions 224a, 224b assist in centering the portion 222a with respect to the tabs 219a, 219b. The locating portions 224a, 224b are curved in this implementation, but in other implementations, the locating portions may be shaped differently, may include protrusions that extend from the intermediate portion, or may not be included.

The front cover 213 is disposed adjacent a front surface of the frame 52 of the rim 50, wherein the front surface refers to the side of the frame 52 that faces toward the operator. The front cover 213 defines a U-shaped edge and includes tabs 215 that extend from an inner edge of the front cover 213. The tabs 215 define openings that engage clips that extend from tabs 217 on the back cover 208 to couple the back cover 208 with the front cover 213. The front cover 213 also includes tabs 223 adjacent the U-shaped edge that engage tabs 219a, 219b of the back cover 208. Although tabs on the front cover 213 are described as defining openings for receiving clips from tabs extending from the back cover 208, one or more of the tabs on the back cover may define the openings while one or more of the corresponding tabs from the front cover define the clips. When the front cover 213 and back cover 208 are coupled, the U-shaped edges of each are aligned and spaced apart across the rim 50. The base 210 is disposed between the U-shaped edges.

At least a portion of the outer cap 206 is transparent and/or translucent. Example materials for the outer cap 206 include glass, polycarbonate, polycarbonate blends, acrylic, nylon, or other suitable materials. The outer cap 206 includes an outer central surface 206a that faces the central axis about which the rim 50 of the steering assembly rotates, an outer front surface 206b that faces the vehicle operator, an outer rear surface 206c that faces the vehicle dashboard, a first side tunnel 206d, and a second side tunnel 206e. The outer front surface 206b, the outer central surface 206a, and the outer rear surface 206c form a C-shape as viewed from an end of the outer cap 206. And, the surfaces 206a, 206b, 206c and tunnels 206d, 206e define a volume. The outer cap 206 is coupled adjacent to the base 210 such that light emitted from the first LED 216a is emitted into tunnel 206d, light emitted from the second LED 216b is emitted into tunnel 206e, and the light emitted into the tunnels 206d, 206e is transmitted out of the transparent and/or translucent portions of the outer surfaces 206a, 206b, 206c of the outer cap 206. The outer surfaces 206a, 206b, and 206c are disposed within the space defined between the U-shaped edges of the front 213 and back cover 208.

One or more surfaces of the outer cap 206 may include an emblem. For example, the emblem may be applied to the surface by sub-surface engraving (e.g., using two or more lasers), etching, or applying a film, coating, or other suitable light altering material that represents the emblem. However, the cap 206 may not include an emblem. In addition, in some implementations, the emblem may be disposed within the volume (e.g., adjacent the base 210) and viewed through one or more of the outer surfaces of the outer cap 206.

For example, light altering films may be disposed on one or more surfaces of the outer cap 206 for diffusing, focusing, blocking, partially blocking, enhancing, or redirecting light passing into the volume defined by the cap 206. The films may be applied to the inner surface of the outer cap, the outer surfaces of the outer cap 206, or a combination thereof, for example.

Foam 54 is molded over the frame 52 and portions of the back cover 208. The collar trim 202 disposed between the outer cap 206 and the U-shaped edges of the front 213 and back covers 208 to cover the gap between the covers 213, 208 and the cap 206. The collar trim 202 is coupled to the back cover 208 (e.g., by engaging tabs, clips, or fasteners, or using another suitable fastening mechanism such as an adhesive). Skin 56 wrapped around the rim 50 is tucked into the space between the collar trim 202 and the covers 208, 213.

FIGS. 16-21 illustrate an illuminated emblem assembly 300 according to yet another implementation. The illuminated emblem assembly 300 includes a transparent and/or translucent outer cap 306, a U-shaped base 302, a U-shaped cover 304, a conductive plate 312 having end portions 318, 320 to which PCBs 314a, 314b are coupled, LEDs 316a, 316b that are coupled to PCBs 314a, 314b, and a diffusing film 310 that is disposed within the base 302.

The U-shaped cover 304 includes a front 304a, rear 304b, and central sidewall 304c that define a U-shaped profile as viewed from an end of the cover 304. In addition, the front 304a and rear sidewalls 304b define U-shaped edges that, along with an opening defined in the central sidewall 304c, define a U-shaped space as viewed from a front or rear side of the cover 304. An inner surface 304d of the cover 304 extends between a central portion of the U-shaped edges of the front 304a and rear sidewalls 304b and over an inner side of the frame 52. The cover 304 is coupled to the inner side of the frame 52 (the inner side being the side facing the central axis about which the rim rotates). The U-shaped cover 304 may be coupled to the frame 52 by engaging one or more fasteners through aligned openings, engaging one or more clips extending from one of the cover 304 or the frame 52 into an opening defined by the other of the frame 52 or the cover, adhesive, or other suitable fastening mechanism.

The conductive plate 312 is disposed adjacent the inner surface 304d of the cover 304 within the U-shaped space defined by the sidewalls 304a, 304b, 304c. The end portions 318, 320 of the conductive plate 312 form a U-shape with the intermediate portion 322 as viewed from a front or rear side of the conductive plate 312. The intermediate portion 322 is relatively planar, and a leg 321 is coupled to wires 326 for providing power to the PCBs 314a, 314b coupled to the ends 318, 320, respectively, of the conductive plate 312.

The base 302 includes end portions 330, 332 and an intermediate portion 328 extending between the end portions 330, 332. The end portions 330, 332 and the intermediate portion 328 form a U-shape as viewed from a front or rear side of the base 302. The base 302 is disposed within the U-shaped space between the end portions 318, 320 of the conductive plate 312 such that end portion 330 of the base 302 is adjacent end portion 318 of the conductive plate 312, end portion 332 of the base 302 is adjacent end portion 320 of the conductive plate 312, and intermediate portion 328 of the base 302 is adjacent intermediate portion 318 of the plate 312. Openings defined in each end portion 330, 332 receive LEDs 316a, 316b, respectively, or receive the light emitted therefrom. A light diffusing film 310 is disposed along the second surface 331 of the base 302. The light diffusing film 310 diffuses the light transmitted through the openings in the end portions 330, 332 as the light travels through the film 310 and into the volume defined by the second surface 331 of the base 302.

The outer cap 306 has a front surface 306a, a central surface 306b, and a rear surface 306c, wherein the central surface 306b extends between edges of the front 306a and rear surfaces 306c and wherein the front 306a, central 306b, and rear surfaces 306c define a U-shaped as viewed from an end of the outer cap 306. The outer cap 306 is disposed volume defined by the second surface 331 of the base 302. At least a portion of the outer cap 306 is transparent and/or translucent. Light emitted from the LEDs 316a, 316b passes through the light diffusing film 310, into the volume defined by the second surface 331 of the base and the outer cap 306, and through the transparent and/or translucent portion(s) of the outer cap 306. As noted above, the outer cap 306 may define the emblem, the emblem may be disposed within the volume, or the assembly 300 may not include an emblem.

In addition, one or more LEDs may be coupled to each PCB, and there may be one or more PCBs instead of the two PCBs shown in this implementation.

FIGS. 23-30 illustrate a fourth implementation of an illuminated emblem assembly 400. The assembly 400 includes a first PCB 414, a second PCB 415, an electrical connector 417 that extends between and electrically couples the first PCB 414 and second PCBs 415, a housing 405, an outer cap 406, LEDs 416a, 416b coupled to the second PCB 415, and a light diffusing film 410.

The first PCB 414 defines openings 420a, 420b that align with openings in the frame 52 and through which fasteners 422 are engaged to couple the first PCB 414 with the frame 52. A portion 417a of the electrical connector 417 is coupled to the PCB 414 and extends through an opening defined in the frame 52. The PCB 414 is coupled adjacent a radially outer surface of the frame 52 of the rim, which is the surface of the frame 52 that faces away from the central axis about which the rim 50 rotates.

The second PCB 415 is disposed within housing 405, and a portion 417b of the electrical connector 417 is coupled to the second PCB 415 and extends through the housing 405. The housing 405 and second PCB 415 are coupled to the frame by connecting the portion 417b with portion 417a of the connector 417, and the housing 405 and second PCB 415 are disposed adjacent a radially inner surface of the frame 52 of the rim 50, which is the surface of the frame 52 that faces the central axis about which the rim rotates.

LEDs 416a, 416b are coupled to the second PCB 415. The light diffusing film 410 is disposed between the LEDs 416a, 416b and the outer cap 406. The light diffusing film 410 diffuses the light emitted from the LEDs 416a, 416b before the light is transmitted through the outer cap 406.

At least a portion of an outer surface 406a of the outer cap 406 is transparent and/or translucent and sits flush with the radially inner surface of the rim 50 of the steering assembly. The outer cap 406 defines a volume between the LEDs 416a, 416b and light diffusing film 410 and the outer surface 406a of the outer cap 406 through which light travels before traveling through the outer surface 406a. The outer surface 406a defines the emblem to be illuminated in this implementation. For example, the emblem may be formed by an opaque film or coating disposed on an inner (or outer) side of the outer surface 406a. However, in other implementations, the emblem may be disposed within the volume or not included.

In addition, one or more LEDs may be coupled to each PCB, and there may be one or more PCBs instead of the two PCBs shown in this implementation.

FIGS. 31-37 illustrate a fifth implementation of an illuminated emblem assembly 500. The assembly 500 includes a first PCB 514, a second PCB (not shown) internal to the housing 505, and electrical connector 517 that extends between and electrically coupled the first PCB 514 and the second PCB, a housing 505, an outer cap 506, LEDs coupled to the second PCB and a light diffusing film are included within the housing 505/outer cap 506.

Figure 32:
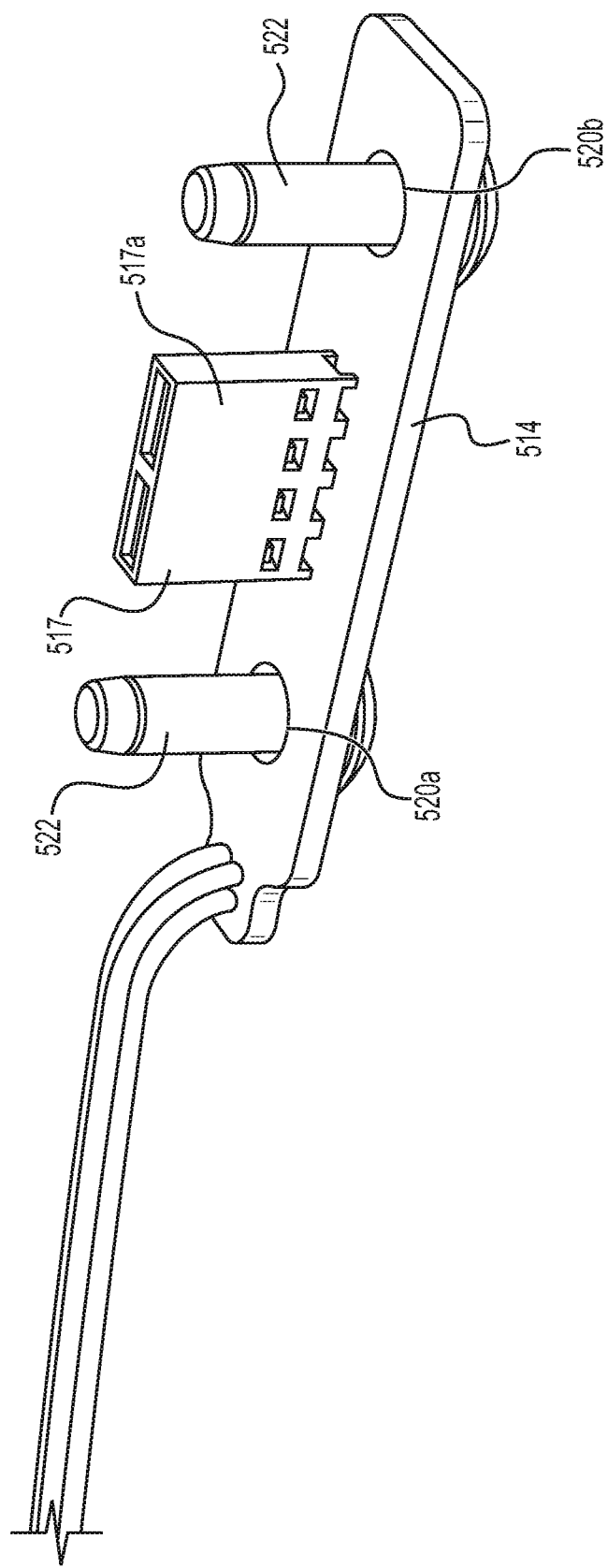
FIG. 32 illustrates a side perspective view of the illuminated emblem assembly shown in FIG. 31 with the outer cap, light diffusing film, and housing removed.
Figure 33:
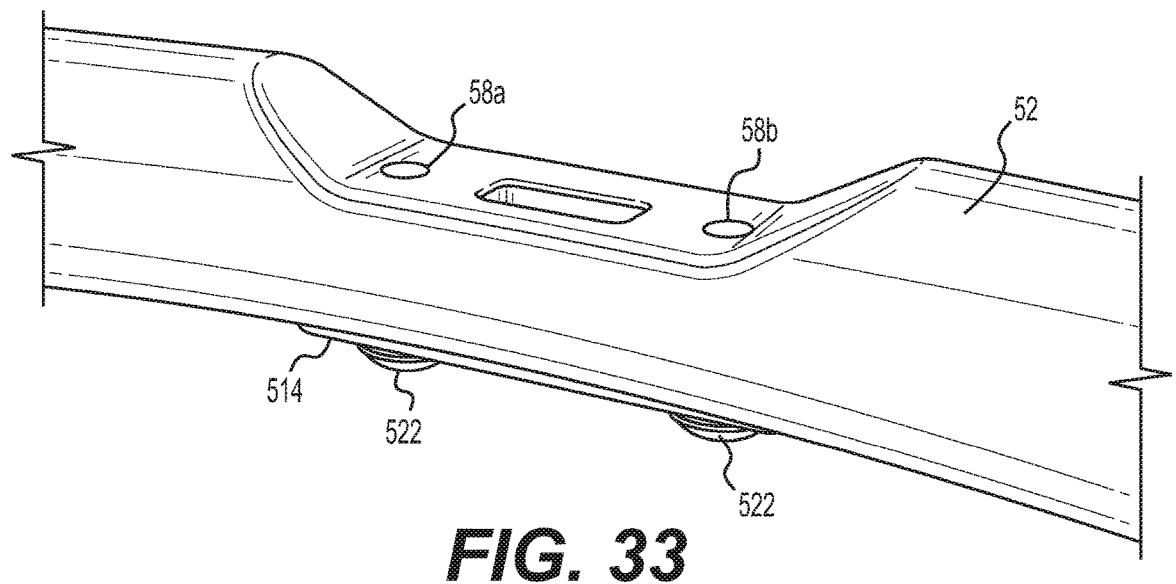
FIGS. 33-34 illustrate perspective views of the illuminated emblem assembly shown in FIG. 31 coupled to the rim of the steering assembly, with the outer cap, light diffusing film, and housing removed.
Figure 34:
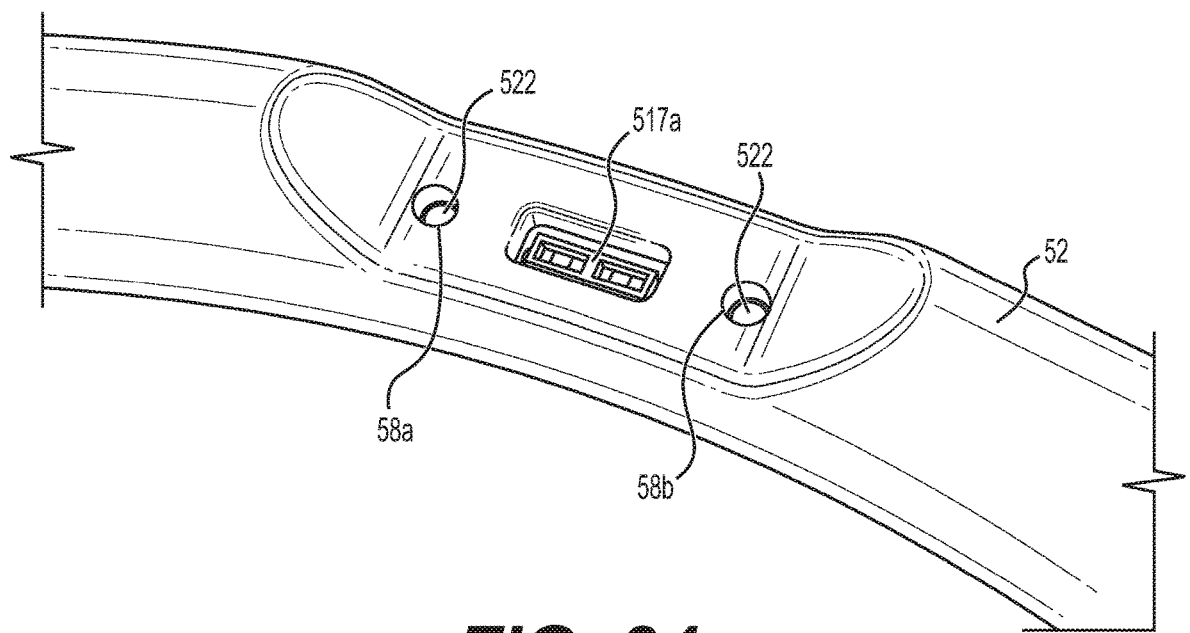

As provided in FIG. 32, the first PCB 514 defines openings 520a, 520b that align with openings 58a, 58b in the frame 52 and through which fasteners 522 are engaged to couple the first PCB 514 with the frame 52. A portion 517a of the electrical connector 517 is coupled to the PCB 514 and extends through an opening defined in the frame 52. As illustrated in FIGS. 33 and 34, the PCB 514 is coupled adjacent a radially outer surface of the frame 52 of the rim, which is the surface of the frame 52 that faces away from the central axis about which the rim 50 rotates.

Figure 35:
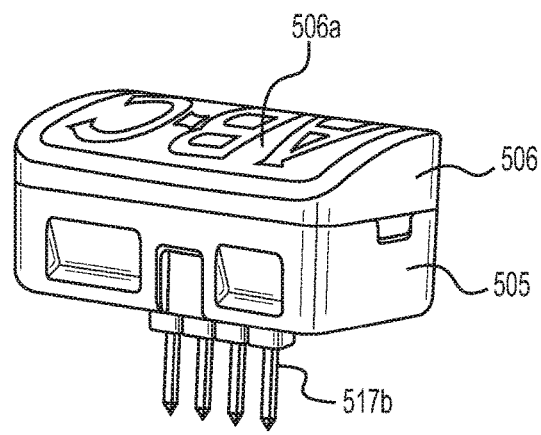
FIG. 35 illustrates a side perspective view of the illuminated emblem assembly shown in FIG. 31 with the first PCB removed.
Figure 36:
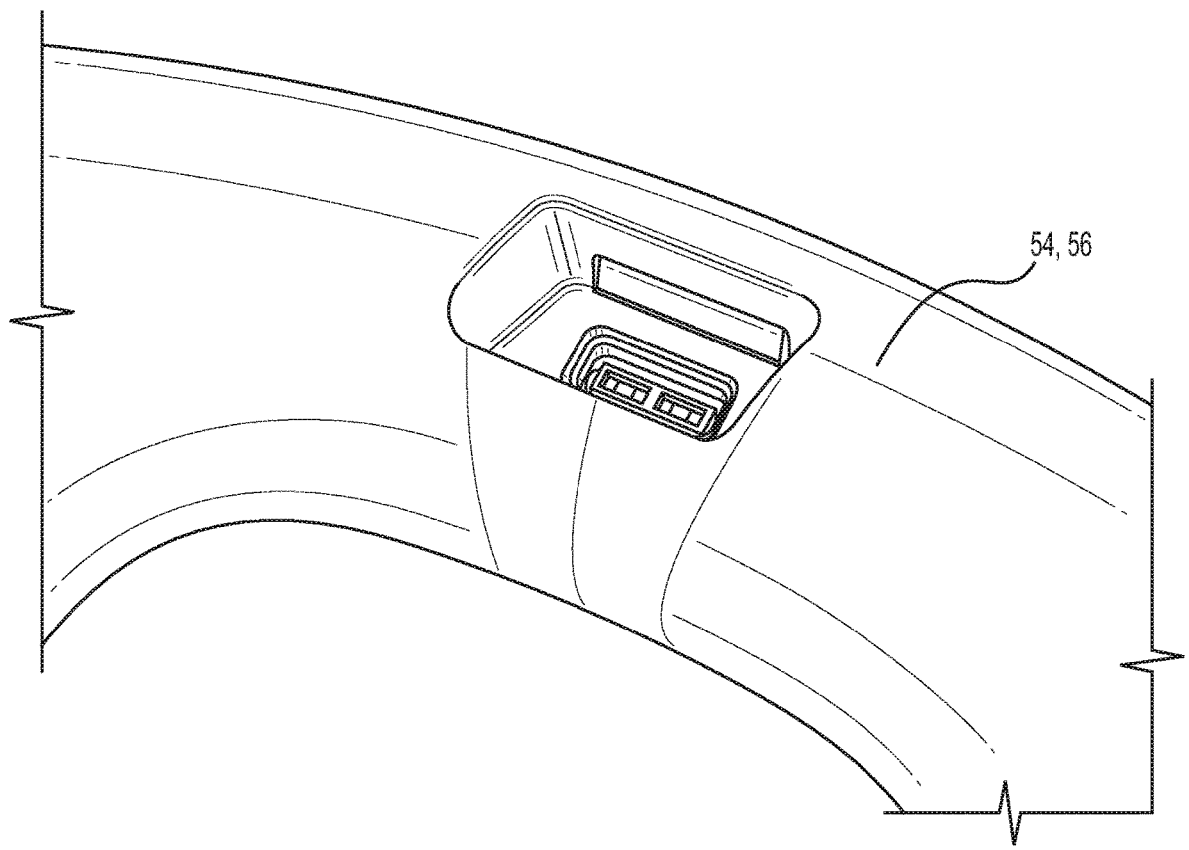
FIG. 36 illustrates a perspective view of the illuminated emblem assembly shown in FIG. 31 coupled to the rim of the steering assembly, with the outer cap, light diffusing film, and housing removed.

As shown in FIG. 35, the second PCB is disposed within housing 505, and a portion 517b of the electrical connector 517 is coupled to the second PCB and extends through the housing 505. The housing 505 and second PCB are coupled to the frame by connecting the portion 517b with portion 517a of the connector 517. As illustrated in FIG. 36, the frame 52 can be covered with foam 54, and the housing 505 and second PCB are disposed adjacent a radially inner surface of the frame 52 of the rim 50 within an opening/recess provided in the foam 54 provided on the portion of the frame 52 that faces the central axis about which the rim rotates. The housing 505 is sized and configured to fill the opening/recess provided in the foam 54.

LEDs are coupled to the second PCB. The light diffusing film is disposed between the LEDs and the outer cap 506. The light diffusing film diffuses the light emitted from the LEDs before the light is transmitted through the outer cap 506.

At least a portion of an outer surface 506a of the outer cap 506 is transparent and/or translucent and sits flush with the radially inner surface of the foam 54 covered rim 50 of the steering assembly. The outer cap 506 defines a volume between the LEDs and light diffusing film and the outer surface 506a of the outer cap 506 through which light travels before traveling through the outer surface 506a. The outer surface 506a defines the emblem to be illuminated in this implementation. For example, the emblem may be formed by an opaque film or coating disposed on an inner (or outer) side of the outer surface 506a. However, in other implementations, the emblem may be disposed within the volume or not included.

In addition, one or more LEDs may be coupled to each PCB, and there may be one or more PCBs instead of the two PCBs described in this implementation.

The illuminated emblem assemblies 100, 200, 300, 400, 500 are described above as being coupled to the rim 50 of the steering assembly, but in other implementations, the assemblies may be coupled to other portions of the steering assembly (e.g., spoke, hub, back cover).

While the foregoing description and drawings represent the preferred implementation of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. For example, combinations of two or more elements that are described as being separately formed and assembled together may be integrally formed together where feasible. In addition, features described herein may be used singularly or in combination with other features. The presently disclosed implementations are, therefore, to be considered in all respects as illustrative and not restrictive, the scope of the invention being indicated by the appended claims and not limited to the foregoing description.

It will be appreciated by those skilled in the art that changes could be made to the implementations described above without departing from the broad inventive concept thereof. It is understood, therefore, that this invention is not limited to the particular implementations disclosed, but it is intended to cover modifications within the spirit and scope of the present invention, as defined by the following claims.

What is claimed:

1. An illuminated emblem assembly for a steering wheel assembly comprising:
   a conductive plate having a generally U-shape and formed from an electrically conductive material, the conductive plate sized and configured to couple with a frame of the steering wheel assembly and including a connector for electrically coupling the conductive plate to a vehicle control system;
   a light source coupled to a PCB, where the PCB is electrically coupled to the conductive plate such that an electrical signal is provided to the light source from the vehicle control system via the PCB;
   a base disposed on a top surface of the conductive plate and having a generally U-shape, the base including an opening adjacent the light source for directing light emitted from the light source towards a U-shaped volume defined by a top surface of the base; and
   an outer cap through which light is transmitted from the light source towards the user, the outer cap being disposed over the base and defining a volume between an inside surface of the outer cap and the base.

2. The assembly of claim 1, further comprising an optical film disposed along the top surface of the base, the optical film diffusing the light transmitted from the opening in the base and into the U-shaped volume defined by the top surface of the base,
   wherein the light source is received within the opening provided in the base.

3. The assembly of claim 2, wherein an end surface of the light source is positioned in contact with a bottom surface of the optical film.

4. The assembly of claim 2, wherein an end surface of the light source is positioned 0.6 mm or less from a bottom surface of the optical film.

5. The assembly of claim 1, wherein the optical film comprises at least one of a light diffusing film, a semi-translucent material, a semi-reflective film, and a one-way reflective film such that the light source is not visible through the optical film, and a light shaping film.

6. The assembly of claim 5, wherein the optical film causes ambient light directed towards the optical film to be reflected back towards the outer cap,
   wherein the amount of ambient light deflected off an outer surface of the optical film is greater than the amount of ambient light that is deflected off the light source and passed back through optical film towards the outer cap.

7. The assembly of claim 1, wherein the PCB is electrically coupled to the first end portion of the conductive plate,
   wherein the PCB directs operation of the light source in response to illumination instructions received from a vehicle control system,
   wherein a second PCB is coupled at an opposite second end portion of the conductive plate, and a second light source coupled to the second PCB such that an electrical signal is provided to the second light source from the vehicle control system via the second PCB.

8. The assembly of claim 1, wherein the conductive plate is electrically coupled to a power source for providing power to the PCB via the connector,
   wherein the conductive plate includes a first end portion and a second end portion opposite and spaced apart from the first end portion, and an intermediate portion extending therebetween, the first and second end portions, forming a U-shape with the intermediate portion as viewed from a front side of the conductive plate,
   wherein the intermediate portion of the conductive plate is relatively planar,
   wherein the first end portion extends in a first plane and the second end portion extends in a second plane, and at least a portion of the intermediate portion extends in a third plane that is transverse to the first and second planes.

9. The assembly of claim 8, further including a cover extending around the base, the conductive plate and a portion of a frame of the steering wheel assembly, the cover including a fastener extending from an inside surface of the cover towards the frame, the fastener sized and configured to engage a corresponding opening defined in the frame for coupling the cover to the frame, wherein the conductive plate includes at least two locating portions that extend from a third plane transverse to the first and second planes, the locating portions spaced apart along an axis extending along the intermediate portion and assist in centering the conductive plate with respect to faster extending from the inside surface of the cover.

10. The assembly of claim 8, wherein the base includes a first end portion and a second end portion opposite and spaced apart from the first end portion, and an intermediate portion extending therebetween, the first and second end portions forming a U-shape with the intermediate portion as viewed from a front side of the base,
wherein the intermediate portion of the base is relatively planar,
wherein the first end portion of the base extends in a first base plane and the second end portion of the base extends in a second base plane, and at least a portion of the intermediate portion of the base extends in a third base plane that is transverse to the first and second base planes,
wherein the base is disposed within a U-shaped volume defined between the first and second end portions of the conductive plate.

11. The assembly of claim 9, wherein the base is disposed within the U-shaped volume defined between the first and second end portions of the conductive plate such that the first end portion of the base is adjacent the first end portion of the conductive plate, the second end portion of the base is adjacent the second end portion of the conductive plate, and the intermediate portion of the base is adjacent the intermediate portion of the conductive plate,
wherein the opening provided in the base includes a first opening and a second opening defined, respectively, at the first and second end portions of the base,
wherein the first and second openings direct light emitted from the light source and a second light source, respectively, towards the U-shaped volume defined by the top surface of the base.

12. The assembly of claim 1, further comprising:
a cover extending between the base and an outer surface of a rim of a steering wheel assembly, the cover including a front sidewall disposed adjacent a front surface of the rim and facing towards an operator, an opposite facing rear sidewall disposed adjacent a rear surface of the rim and facing away from the operator, and a curved central sidewall extending between the front and rear sidewalls,
wherein the front, rear and central sidewalls define a U-shaped profile as viewed from an end of the cover,
wherein the front and rear sidewall each include a U-shaped edge that extends longitudinally along the cover, the U-shaped edges and an opening provided in the central sidewall define a U-shaped volume as viewed from a front side of the cover,
wherein the base is positioned adjacent the cover such that the U-shaped edges and edge of the opening provided in the central sidewall of the cover are located adjacent the corresponding U-shaped side edges and a top edge of the base.

13. The assembly of claim 12, wherein an outer surface of the cover has a surface contour sized and configured to correspond to an outer surface of a rim of the steering wheel assembly,
wherein an outer surface of the cover has a surface contour that extends outward from an outer surface of a rim of the steering wheel assembly,
wherein an outer surface of the outer cap has a surface contour sized corresponding to an outer surface of the cover.

14. The assembly of claim 1, wherein a decorative emblem is provided on a location including at least one of a surface of the outer cap and disposed in the volume between an inside surface of the outer cap and the base where the decorative emblem is viewed through the outer cap.

15. The assembly of claim 1, wherein the outer cap is constructed from a material that is at least one of a transparent material and a translucent material,
wherein the material of the outer cap includes at least one of a colored material, a clear material, and a patterned material.

16. An illuminated emblem for a steering wheel assembly comprising:
a conductive plate having a generally U-shape and formed from an electrically conductive material;
a light source coupled to a PCB, where the PCB is electrically coupled to the conductive plate such that an electrical signal is provided to the light source via the PCB;
a base coupled to a frame of the steering wheel assembly, where the conductive plate is located between the base and the frame, the base having a generally U-shape and including an opening adjacent the light source for directing light emitted from the light source towards a U-shaped volume defined by the base;
an outer cap coupled to the base through which light emitted from the light source is transmitted towards the user, the outer cap defining a volume between an inside surface of the outer cap and a top surface of the base; and
a decorative emblem constructed from an at least partially translucent material, the decorative emblem located between the light source and a central axis of the steering wheel assembly,
wherein the decorative emblem is located on at least one of an outer surface of the outer cap and an inner surface of the outer cap.

17. The assembly of claim 16, further comprising an optical film disposed between the base and the light element, the optical film reflecting ambient light passing through the cap back such that the light source is not visible through the cap when not illuminated,
wherein the decorative emblem is located between the optical film and the central axis of the steering wheel assembly,
wherein the light source is located adjacent the optical film.

18. The assembly of claim 16, wherein the conductive plate is electrically coupled to a vehicle control system and operation of the light source is directed by operation instructions received from a vehicle control system,
wherein the operation instruction directs illumination of the light source to provide at least one of a decorative effect and provide vehicle information to the driver.

* * * * *